June 16, 1936.   B. SASSEN   2,044,020
AUTOMATIC PATTERN CONTROLLED MILLING MACHINE
Filed Aug. 16, 1935   12 Sheets-Sheet 1

INVENTOR.
BERNARD SASSEN
BY
A. K. Parsons
ATTORNEY.

June 16, 1936. B. SASSEN 2,044,020
AUTOMATIC PATTERN CONTROLLED MILLING MACHINE
Filed Aug. 16, 1935 12 Sheets-Sheet 2
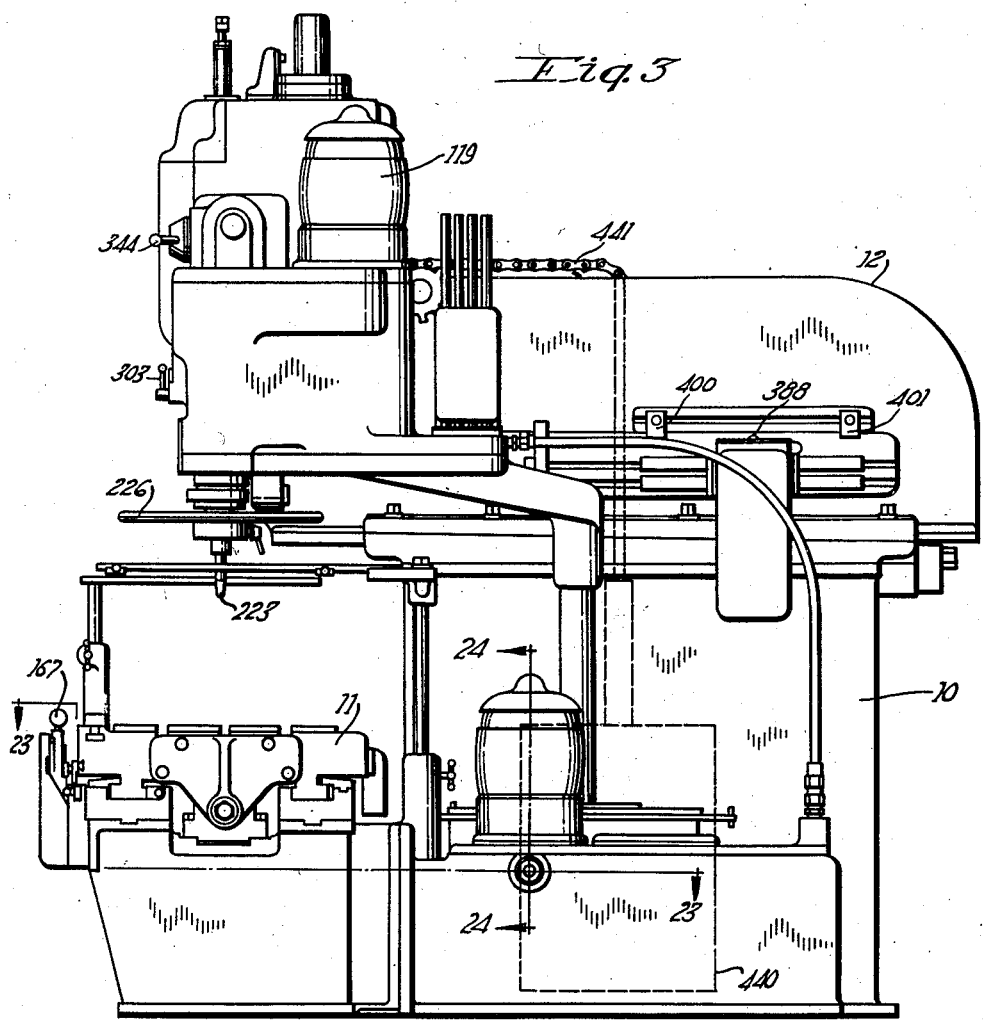
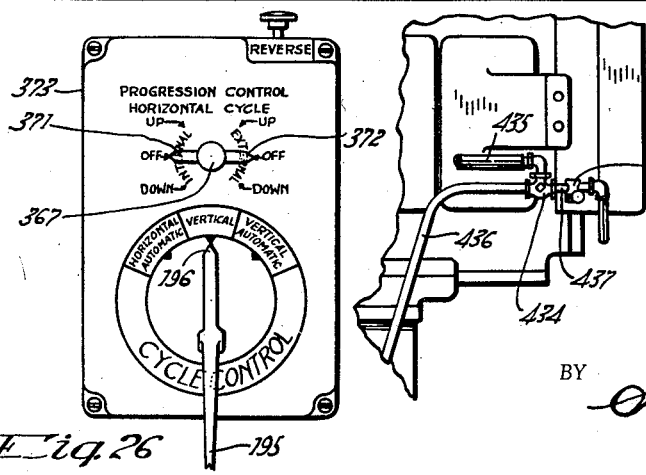
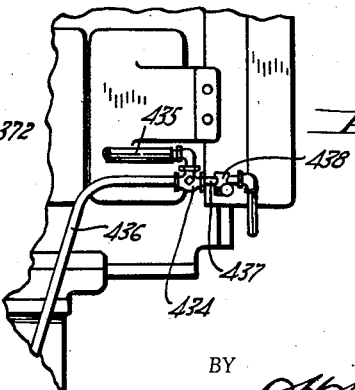
INVENTOR.
BERNARD SASSEN
BY
AHK Parsons
ATTORNEY.

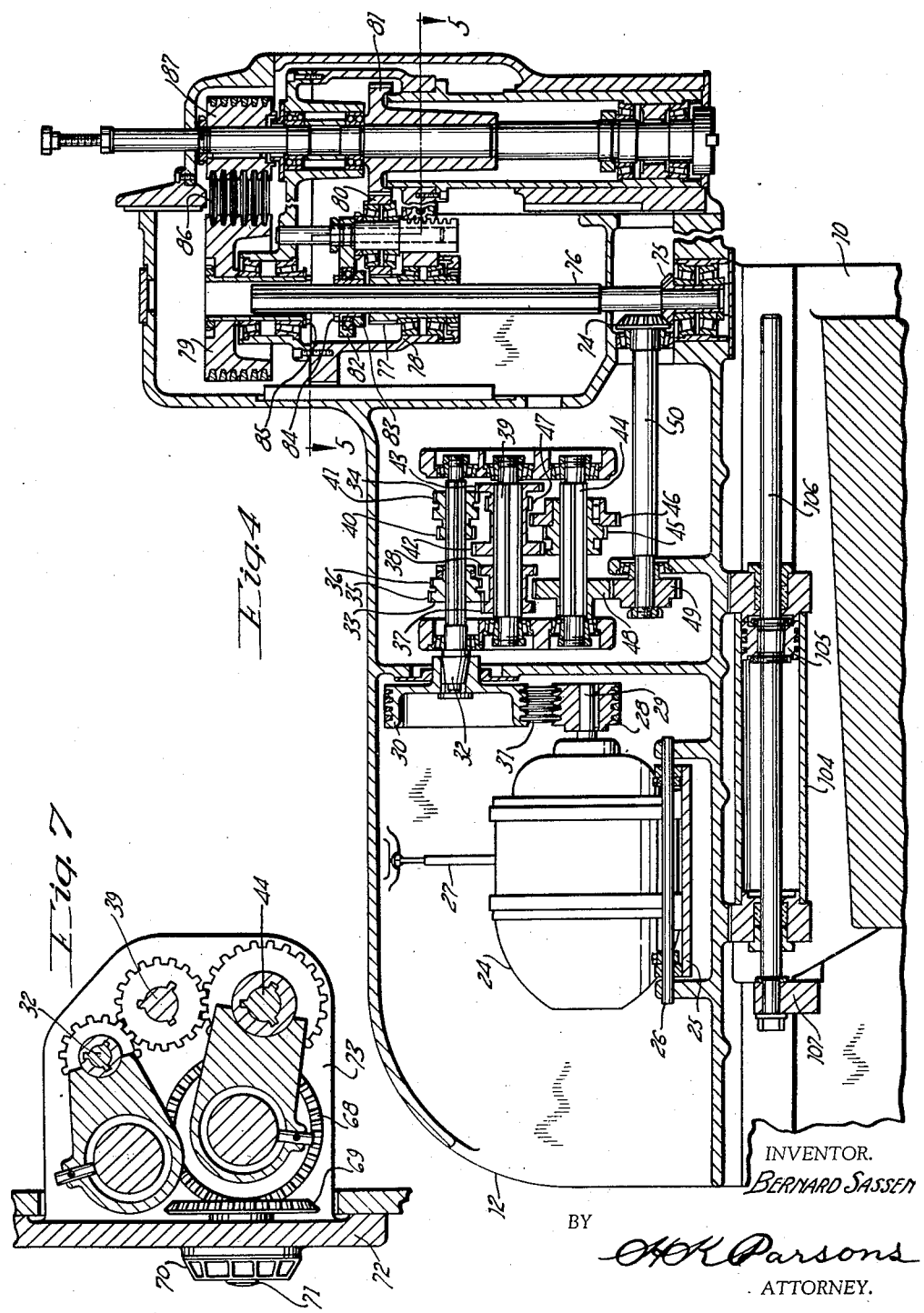

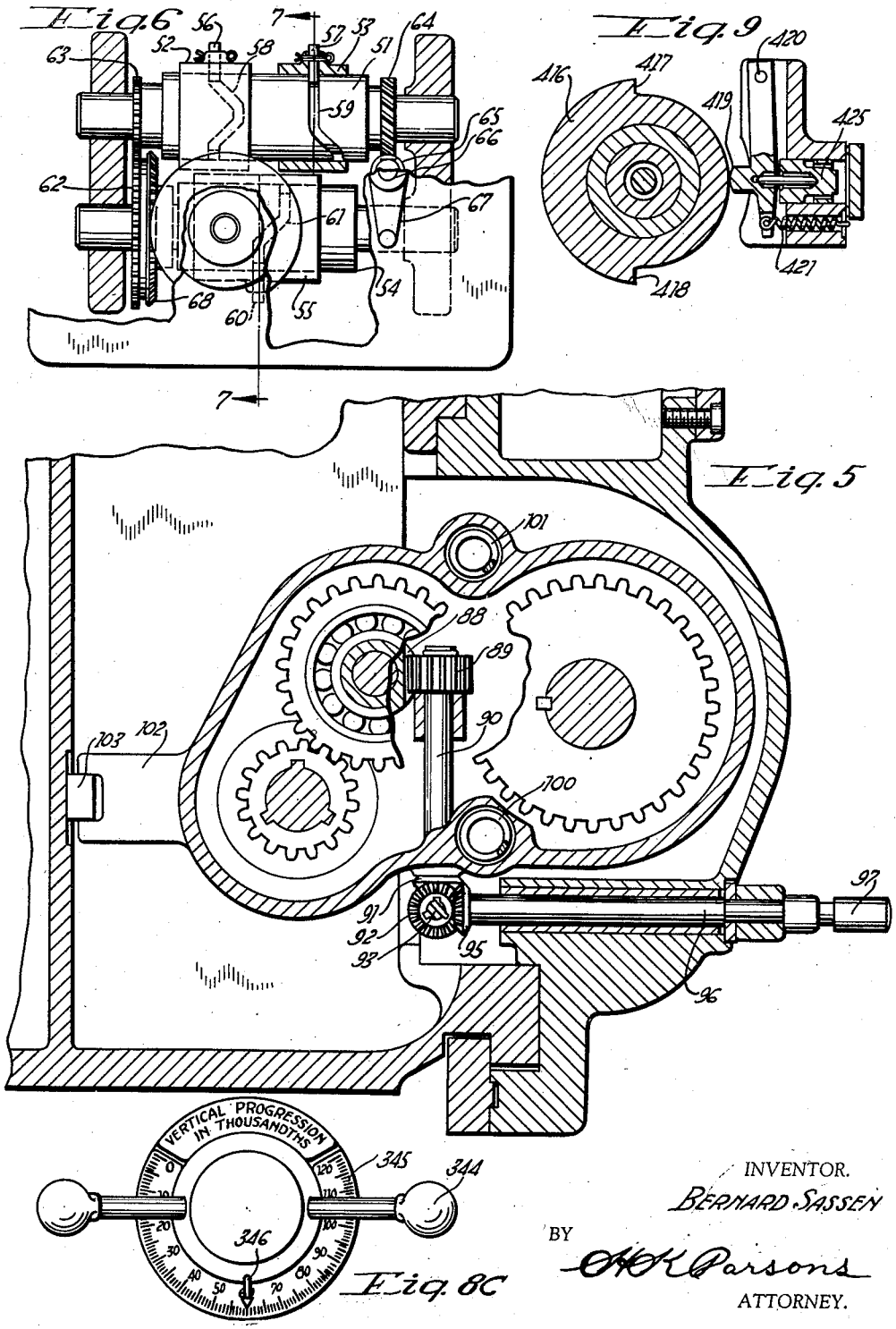

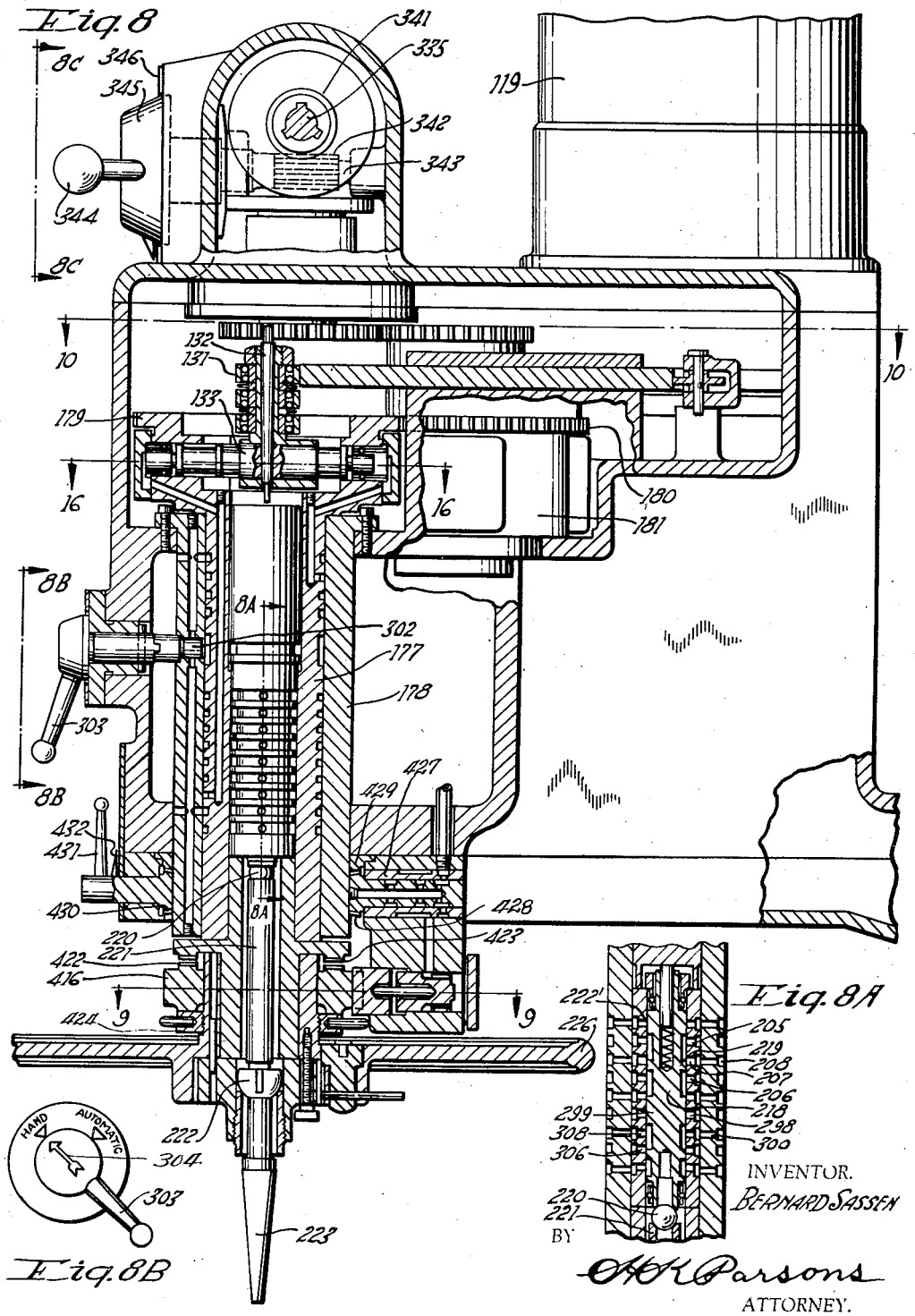

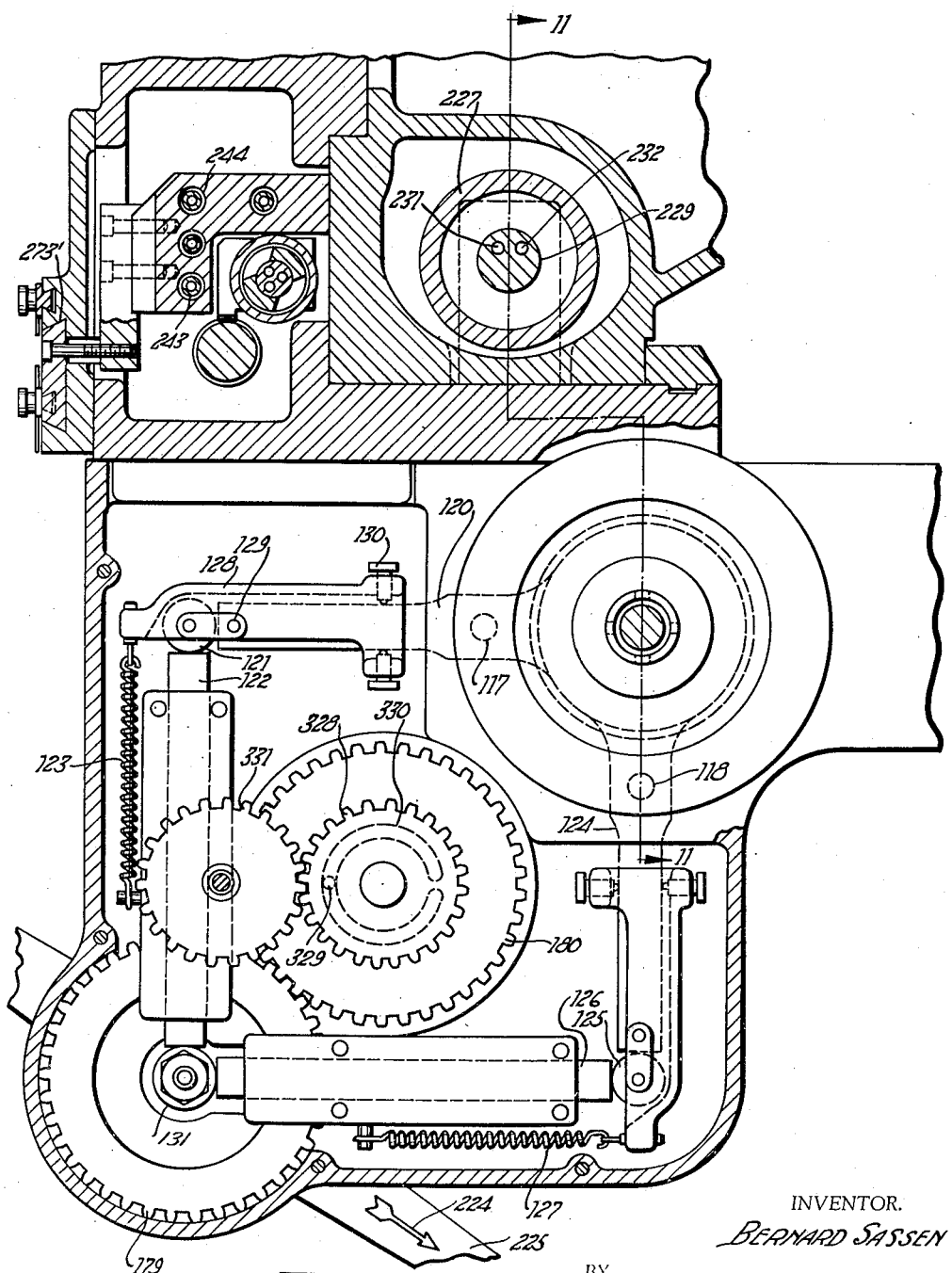

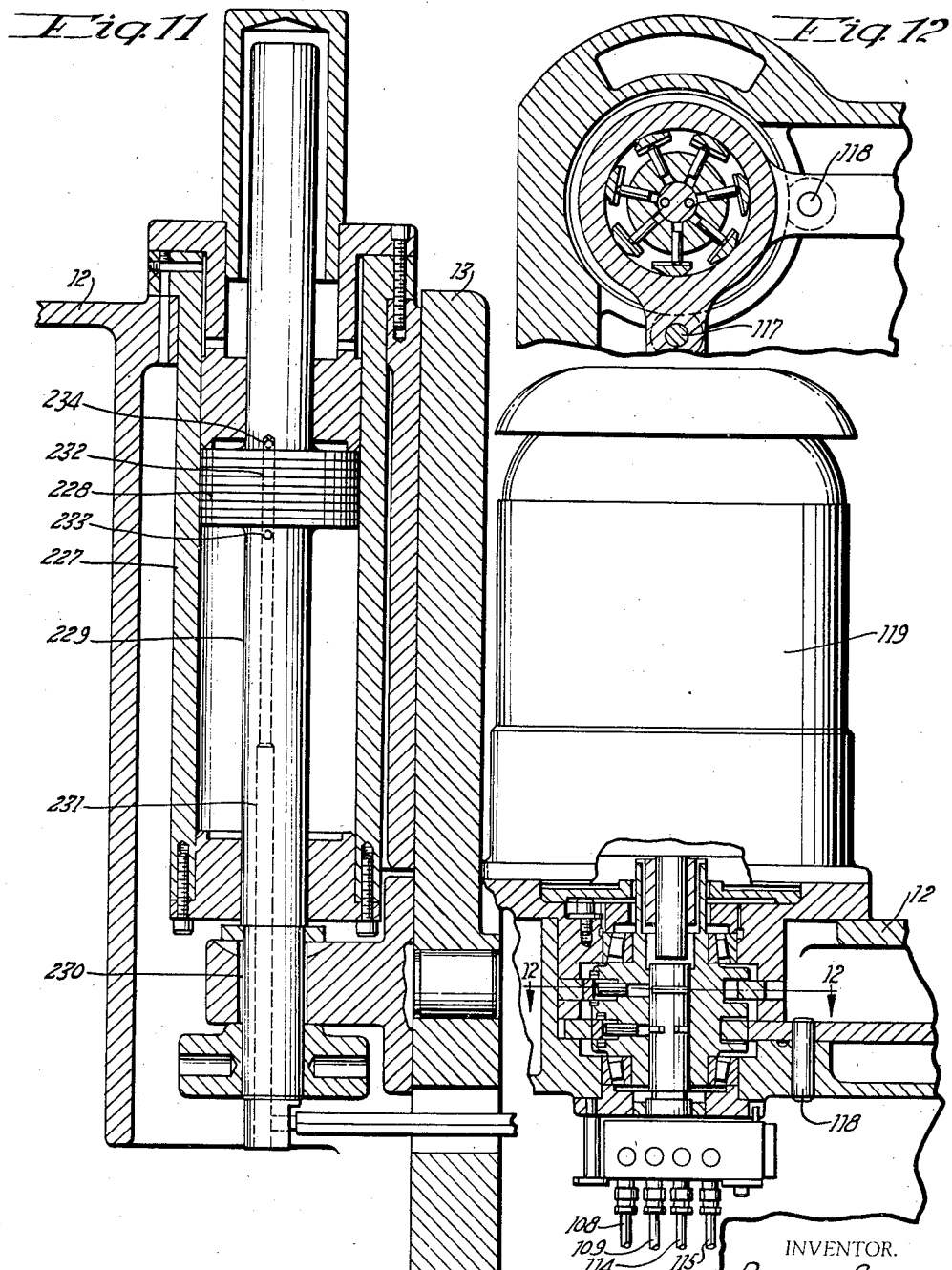

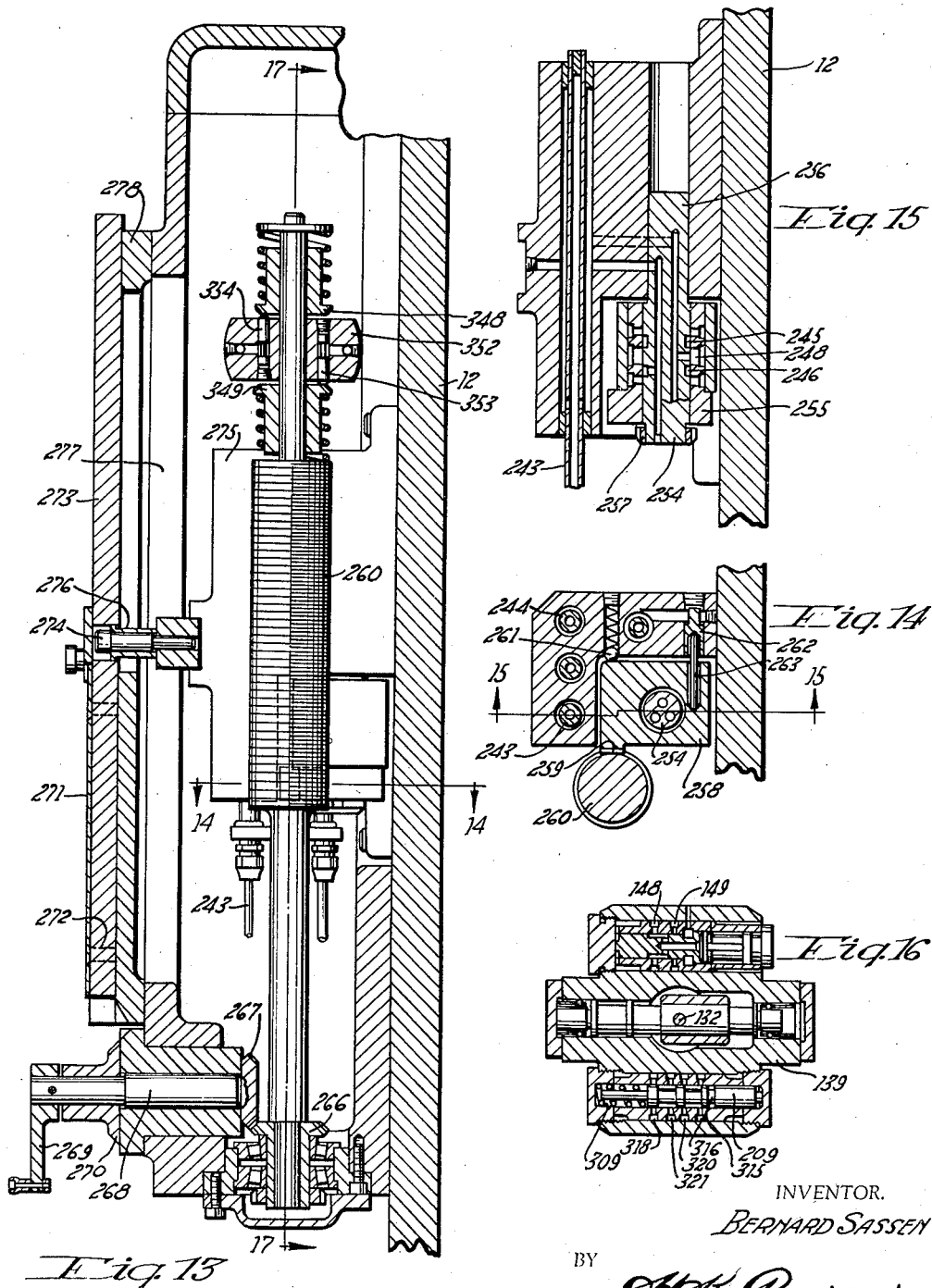

June 16, 1936.  B. SASSEN  2,044,020

AUTOMATIC PATTERN CONTROLLED MILLING MACHINE

Filed Aug. 16, 1935   12 Sheets-Sheet 9

INVENTOR.
BERNARD SASSEN
BY
AHK Parsons
ATTORNEY.

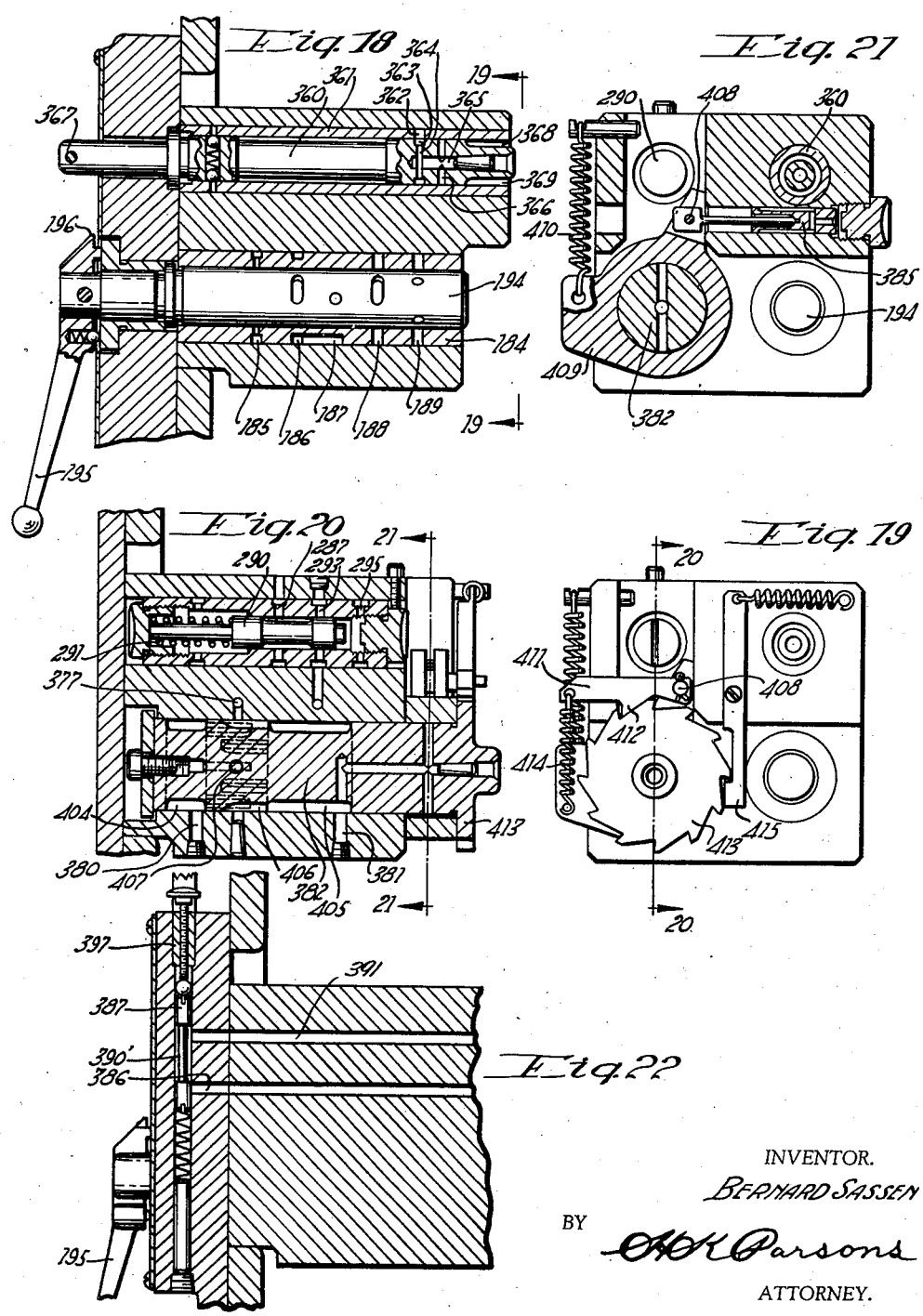

June 16, 1936.  B. SASSEN  2,044,020

AUTOMATIC PATTERN CONTROLLED MILLING MACHINE

Filed Aug. 16, 1935    12 Sheets-Sheet 11

INVENTOR.
BERNARD SASSEN

BY
A. K. Parsons
ATTORNEY.

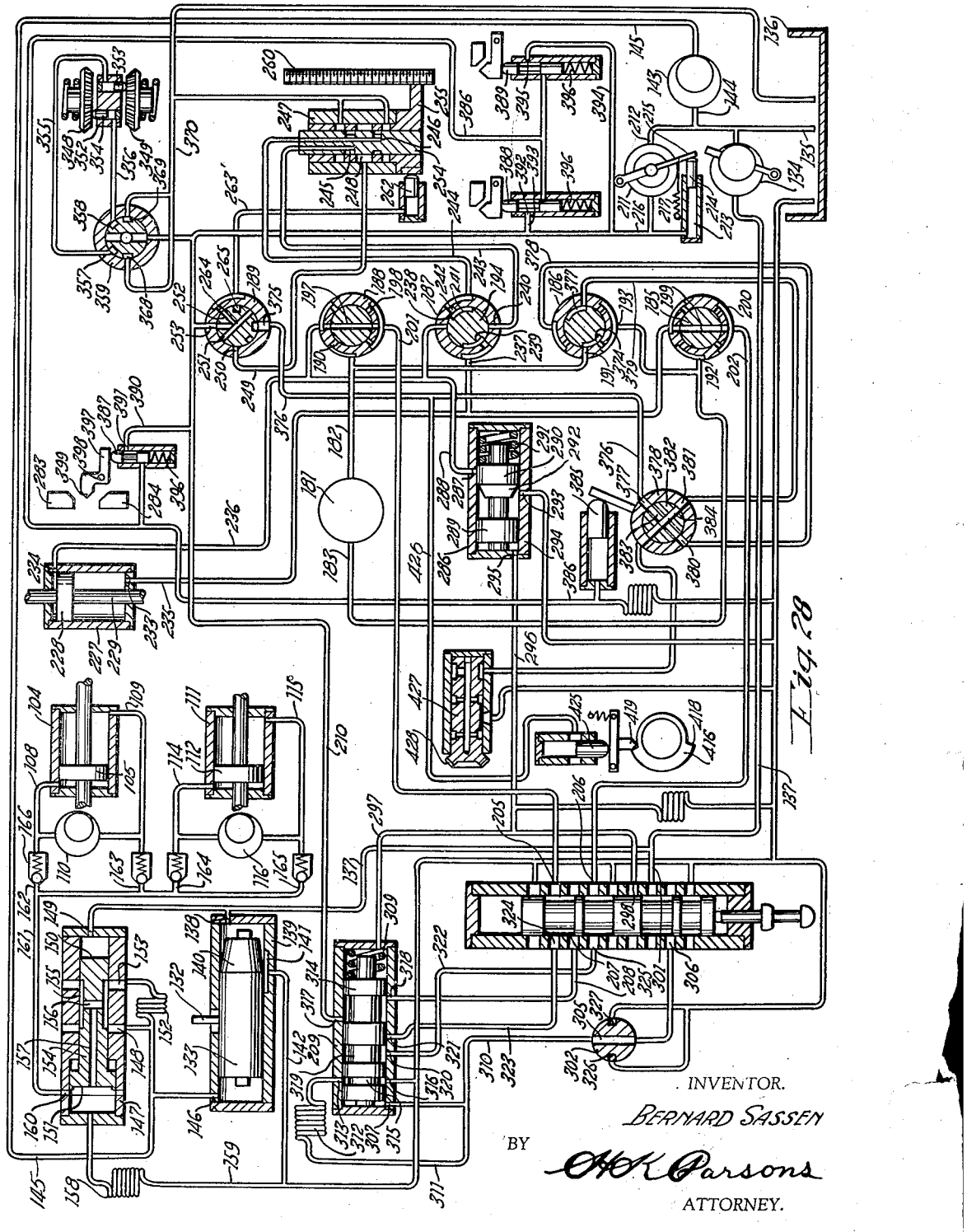

Patented June 16, 1936

2,044,020

UNITED STATES PATENT OFFICE 2,044,020

AUTOMATIC PATTERN CONTROLLED MILLING MACHINE

Bernard Sassen, Cincinnati, Ohio, assignor to The Cincinnati Milling Machine Co., Cincinnati, Ohio, a corporation of Ohio Application August 16, 1935, Serial No. 36,562

20 Claims. (Cl. 90—13.5)

This invention relates to machine tools and more particularly to automatic pattern controlled milling machines.

One of the objects of this invention is to provide an improved pattern controlled machine which may be selectively utilized for two-dimensional profiling purposes or for three-dimensional die-sinking purposes.

Another object of this invention is to improve hydraulically operated pattern controlled machines by more directly coupling the tracer control element to the actual part to be moved, thereby reducing the time delay between the initial movement of the tracer and the follow-up movement of the final controlled part.

A further object of this invention is to provide in a pattern controlled machine tool having a tracer mechanism, which is relatively movable with respect to a support and in a direction normal thereto, improved safety means for rendering the manually operable means impotent upon contact being established by the tracer.

An additional object of this invention is to provide a simplified cycle control mechanism for conditioning the power circuit of the machine to produce different cycles of operation.

A still further object of this invention is to provide improved means for varying the chip size during a die-sinking operation.

Still another object of this invention is to provide an improved trip control mechanism for automatically changing the direction of relative feeding movement between the tracer and pattern.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 3 is a side view of the machine shown in Figure 1 as viewed from the right of that figure.

Figure 4 is a vertical section through the ram taken on the line 4—4 of Figure 1.

Figure 5 is a section on the line 5—5 of Figure 4.

Figure 6 is a view in elevation and partly in section showing the gear shifter mechanism for the transmission shown in Figure 4.

Figure 7 is a section on the line 7—7 of Figure 6.

Figure 8 is a section through the tracer head as viewed on the line 8—8 of Figure 1.

Figure 8a is a section on the line 8a—8a of Figure 8.

Figure 8b is a detail view of one of the control levers as viewed on the line 8b—8b of Figure 8.

Figure 8c is a detail view of the vertical progressive control lever as viewed on the line 8c—8c of Figure 8.

Figure 9 is a detail section on the line 9—9 of Figure 8.

Figure 10 is a section on the line 10—10 of Figure 8.

Figure 11 is a vertical section taken on the line 11—11 of Figure 10.

Figure 12 is a detail section taken on the line 12—12 of Figure 11.

Figure 13 is a vertical section on the line 13—13 of Figure 1 showing the servo-control elevating screw.

Figure 14 is a detail section on the line 14—14 of Figure 13.

Figure 15 is a detail section on the line 15—15 of Figure 14.

Figure 16 is detail section on the line 16—16 of Figure 8.

Figure 18 is a section through the cycle control valve as viewed on the line 18—18 of Figure 1.

Figure 19 is an end view of the cycle control valve block as viewed on the line 19—19 of Figure 18.

Figure 20 is a section through the cycle control valve block as viewed on the line 20—20 of Figure 19.

Figure 21 is a section on the line 21—21 of Figure 20.

Figure 22 is a section through the cycle control valve block showing the details of the manually adjustable reverse valve.

Figure 26 is an enlarged detail view showing the markings on the cycle control valve plate.

Figure 27 is a detail view of the coolant selector control valve attached to the left side of the machine as viewed in Figure 1.

Figure 28 is a diagrammatic view of the hydraulic circuit of the machine.

A machine similar to that shown in my copending application, Serial Number 747,267, filed October 8, 1934 in the United States Patent Office, has been selected to embody the principles of this invention, although it is to be understood that the various elements, such as the work support, tool spindle, and the like, could be allocated to other than the planes in which they are shown without departing from the principles of this invention.

Figure 1:
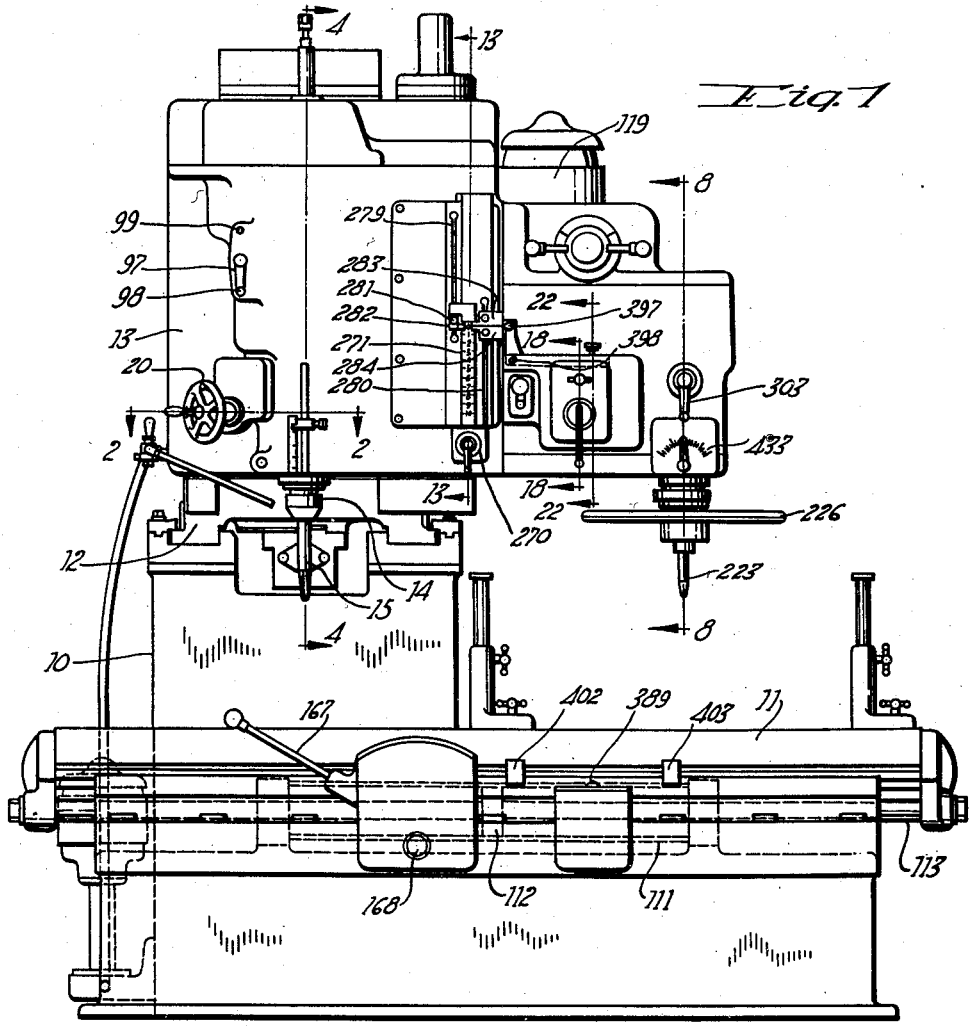
Figure 1 is a front elevation of a machine tool embodying the principles of this invention.

As shown in Figures 1 and 3, the machine structurally comprises a bed unit 10 upon which is slidably mounted a pair of slides 11 and 12 which may be termed a table and a ram respectively. Mounted for vertical movement on the end of the ram is a third slide 13 which may be termed a carrier, having journaled therein a tool spindle 14. The table and ram are movable along axes which lie in intersecting vertical planes and the carrier 13 is movable in a direction parallel to one of these planes, whereby as respects the end of a tool 15 carried by the spindle and a given point on the work support, relative movement may be had between these points in any one of two directions in a horizontal plane, or in a vertical plane for profiling purposes; or in three different directions for die-sinking purposes.

Figure 2:
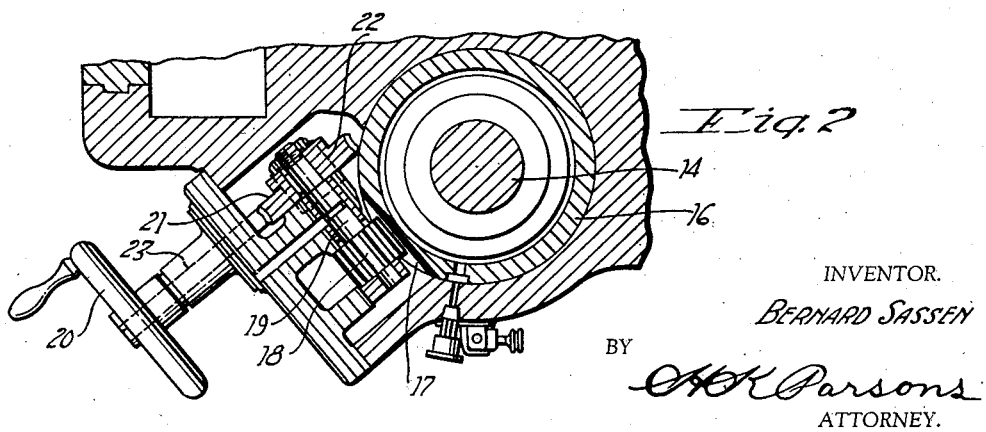
Figure 2 is a detail section on the line 2—2 of Figure 1, showing the cutter spindle quill adjusting mechanism.

The cutter spindle is journaled in a quill 16 chiefly for adjustment purposes and the mechanism for accomplishing this is more particularly shown in Figure 2. The quill has rack teeth 17 formed integral therewith which are interengaged by a pinion 18 keyed on shaft 19 which is rotatable from a hand wheel 20 through a worm 21 and a worm wheel 22, the latter being keyed with the shaft 19. The worm is keyed to a shaft 23 upon which the hand wheel 20 is also mounted.

The power means for rotating the spindle, or in other words, the spindle transmission, is more particularly shown in Figures 4, 5, 6, and 7 to which reference may now be had. A prime mover in the form of an electric motor 24 is mounted on a support 25 which is pivotally mounted at one side on the rod 26 carried by an integral part of the ram 12 and an adjusting rod 27 is provided whereby the driving pulley 28 on the end of the motor shaft 29 may be adjusted relative to a main drive pulley 30 to maintain tension in the multiple V belts 31 which connect the pulley 28 to the pulley 30.

The pulley 30 is keyed to the end of shaft 32 upon which is splined a pair of shiftable gear couplets 33 and 34, the first couplet including gears 35 and 36 which are shiftable respectively into mesh with gears 37 and 38 fixed with shaft 39. The other couplet comprises gears 40 and 41 shiftable into mesh respectively with gears 42 and 43, also carried by shaft 39, whereby the latter may be rotated at any one of four different speeds. A third shaft 44, parallel to the other shafts, carries a pair of shiftable gears 45 and 46 adapted to be intermeshed with gear 42 or gear 47 carried by shaft 39. The shaft 44 has a final output gear 48 intermeshing with gear 49 which is keyed to the end of shaft 50.

The mechanism for shifting these gears is partly shown in Figures 6 and 7 and comprises a rotatable cam shaft 51 upon which is slidably mounted the shifters 52 and 53 for the couplets 33 and 34 respectively; and a second cam shaft 54 on which is slidably mounted a shifter 55 for the gear pair 45—46. The shifters 52 and 53 have followers 56 and 57 which ride in cam grooves 58 and 59 respectively of cam shaft 51, and the shifter 55 has a follower 60 which rides in a cam groove 61 formed in the cam shaft 54. These two cam shafts are interconnected for simultaneous rotation by gears 62 and 63 which are in the ratio of two to one. The shaft 51 has a spiral gear 64 which meshes with a spiral gear 65 integral with shaft 66 which has secured to one end a manually operable handle 67 whereby rotation of this handle will effect rotation of the cam shaft 51, and through gears 63 and 62, rotation of shaft 54, but at one-half the rate of speed as the shaft 51.

A bevel gear 68 integral with gear 62 engages bevel gear 69, as shown in Figure 7, for rotation of a rate dial 70 which is secured on the end of shaft 71, which shaft carries the bevel gear 69. The shaft 71 is journaled in the wall 72 of the detachable shifter bracket 73 and is on the exterior of the machine for observation by the operator. The three cam grooves are so shaped as to successively position the gears to effect a geometrical progression of speeds.

The shaft 50 has a bevel gear 74 secured to the end thereof in engagement with a bevel gear 75 fixed to the end of the vertically extending spline shaft 76. This shaft passes through the splined bore of a spur gear 77 which is journaled in a bracket 78, which bracket is integral with the quill 16 for movement therewith.

The shaft 76 also passes through the bore of a pulley 79, also anti-frictionally journaled in the bracket 78. The spur gear 77 is operatively connected by a shiftable idler gear 80 to gear 81 keyed to the cutter spindle 14. The idler gear 80 is anti-frictionally journaled on a shiftable sleeve 82 which is adapted to be moved upward from the position shown in Figure 4 to disengage the idler gear from the spur gear 77 and thereby break the driving connection with the gear 81. When this is done, however, a shifter fork 82 moves a clutch member 83 splined on the shaft 76 into driving engagement with the pulley 79 by interengagement of clutch teeth 84 with similarly formed clutch teeth 85 carried by the end of the pulley 79.

The pulley 79 is connected by a plurality of V belts 86 to the small pulley 87 in a multiplying ratio whereby when the pulley 79 is driving the cutter spindle 14, the same is rotated at a relatively high speed and when the pinion 77 is driving the spindle it is rotated at a relatively slow speed.

As shown in Figure 5, the sleeve 82 has integral rack teeth 88 interengaged by a pinion 89 secured to the end of shaft 90. This shaft is connected by bevel gears 91 and 92 to a vertical spline shaft 93. The shaft 93 is held against axial movement in the carrier 13 and the bevel gear 92 is fixed with the bracket 78 for movement therewith. The spline shaft 93 also has a bevel gear 94 intermeshing with bevel gear 95 fixed to the end of shaft 96, which shaft extends through the carrier to the front of the machine where it is provided with a manually operable handle 97 whereby rotation of this handle will, through the bevel gear, cause rotation of shaft 90 and thus a shifting of the idler gear 80 and shifter fork 82 so that a change may be made from high speed to low speed, or low speed to high speed in spite of the fact that the bracket 78 is in itself vertically adjustable.

As shown in Figure 1, the handle 97 is adapted to interengage with a pair of notches 98 and 99 for holding the same in either one of its two positions.

The bracket 78 is guided on a pair of rods 100 and 101, more particularly shown in Figure 5, and held against rotation by a lug 102 which projects from the rear side thereof and engages a hardened steel guide 103.

Thus a spindle transmission has been provided for the cutter spindle which is adjustable to yield a high series or a low series of rates and the controls therefor are conventionally located on the exterior of the machine for adjustment by the operator.

In order that the movement of the various slides may be automatically controlled from a tracer, they are each provided with an hydraulic motor which in the present instance is in the form of a piston and cylinder. In carrying out profiling operations only two slides are utilized which, in this machine, would usually be the ram and table, and the mechanism for operating and controlling the movement of these two slides for profiling purposes will now be explained.

As shown in Figure 4, the ram 12 is provided with a cylinder 104 which is fixed therewith and has a contained piston 105 integral with a piston rod 106 which extends beyond either end of the cylinder and is attached at 107 to the bed 10. Admission of fluid pressure to opposite ends of the cylinder will cause opposite movement of the cylinder 104 and thereby the slide 12.

Referring to Figure 28, the cylinder 104 is connected by channels 108 and 109 to a reversible variable delivery pump 110.

The table 11, as shown in Figure 1, has a cylinder 111 and a contained piston 112, the latter being connected by a piston rod 113 which projects through both ends of the cylinder for connecting the piston to opposite ends of the table to cause movement thereof.

Referring again to Figure 28, the cylinder 111 is connected by a pair of channels 114 and 115 to a second reversible variable delivery pump 116.

A cross section through one of these pumps is shown in Figure 12, and each pump is provided with a pendulum which are pivotally mounted for adjustment about fulcrums 117 and 118 respectively, which serve to change the direction of flow as well as the quantity of flow. These pumps are co-axial as shown in Figure 11 and are driven from a common prime mover 119 which is carried by the ram 12.

In Figure 10 is shown the mechanism by which the pumps are connected for joint control. The pendulum 120 carries a roller 121 which engages against the end of a slideable rod 122 and is held in engagement therewith by a spring 123. The pump pendulum 124 also carries a roller 125 which is held against the end of a slideable rod 126 by a spring 127. Each roller, however, is rotatably mounted in an adjustable arm 128 which is pivotally connected by a pin 129 to the pendulum and a pair of set screws 130 are carried by the arm and abut against opposite sides of the pendulum whereby the set screws may be adjusted to position the pendulum relative to the position of the rod, 122 or 126 which is fixed length. The reason for this is that the rods 122 and 126 both engage the periphery of a roller 131 which is carried, as shown in Figure 8, by a control pin 132. This pin is fixed in a plunger 133 which is axially movable to eccentrically position the pin 132 with respect to the axis of the tracer head.

When the pin is concentric with the axis of the tracer head both pendulums should be in such position that the volumetric delivery of the pumps 110 and 116 should be absolutely zero. Therefore, in setting up, the pin 132 is first positioned concentric with the axis of the tracer 10 and then the set screws 130 are adjusted to exactly position the pendulums to yield a zero displacement of the pumps while the roller 121 is still held in contact with the end of the rod 122. Since the lever arm of the adjusting screws 130 with respect to the axis of pivot pin 129 is considerably greater than the lever arm of the axis of roller 121 with respect to the pivot 129, a very fine and accurate adjustment may be obtained and maintained.

After this adjustment has been made it will be evident that any movement of the roller 131 in any radial direction from its center position will simultaneously affect the position of the pump pendulums and cause movement of the slides controlled by said pendulums. The arrangement is such that movement of the pin in any radial direction from its center position will cause a corresponding resultant movement between the tool and the work table in the same direction, and the further the pin is moved in a given direction the faster will be the rate of said relative movement.

A first means has been provided for controlling the radial movement of the pin which will be termed the feed rate control mechanism, and a second means has been provided for controlling the angular movement of the pin about its center position for changing the direction, and this means may be controlled automatically by the tracer, or manually by means of a steering wheel associated with the tracer head.

The means for controlling the radial movement of the pin will now be described, reference being had to Figures 1, 3, 8, 23, 24, 25, and 28. The mechanism for controlling the position of the pin is so designed that the position of the pin varies in accordance with the rate of flow in a control channel whereby in order to change the position of the pin to increase or decrease the rate of operation of the pumps it is only necessary for the operator to change the rate of flow in said channel. This is accomplished by providing a variable delivery pump and a control lever for adjusting the delivery of the pump and associating a graduated scale with the control lever, whereby for any given adjustment of the pump a reading will be obtained which will directly indicate the rate of linear travel of the tool with respect to the work.

Figure 23:
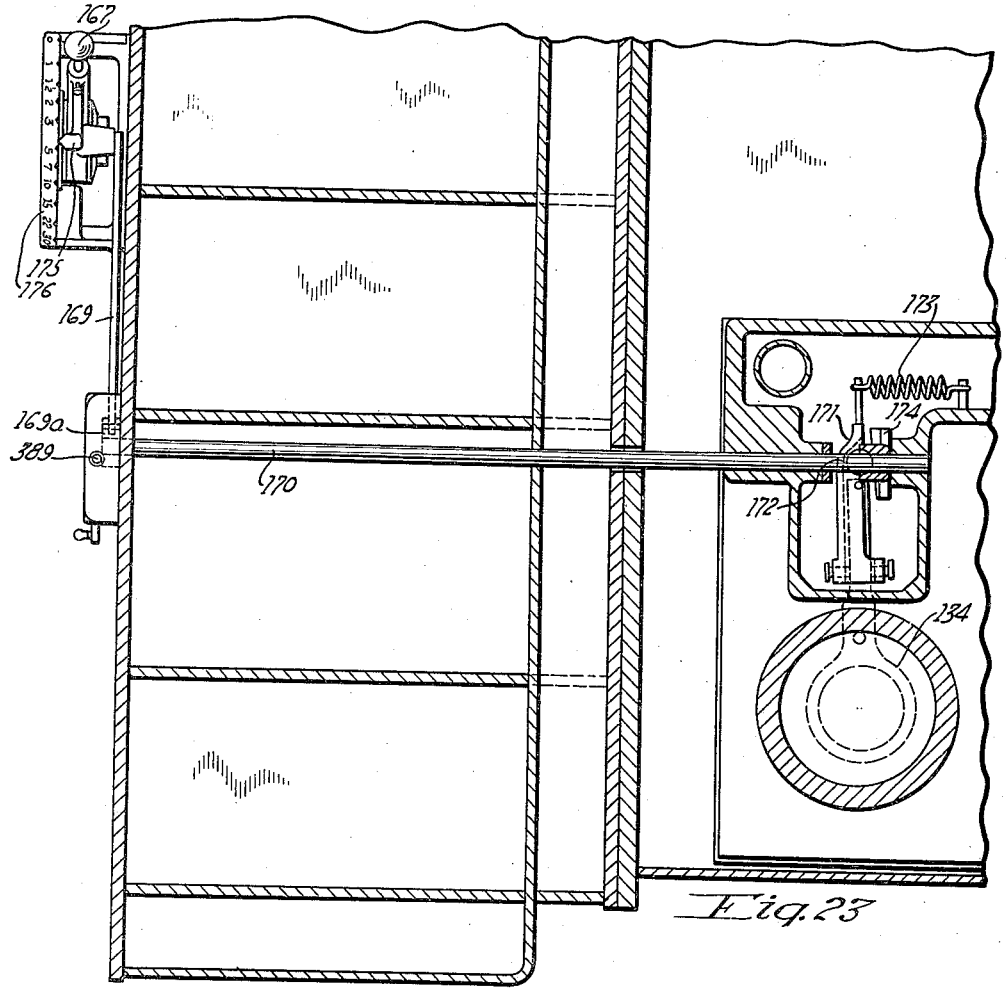
Figure 23 is a section through the bed of the machine as viewed on the line 23—23 of Figure 3.
Figure 24:
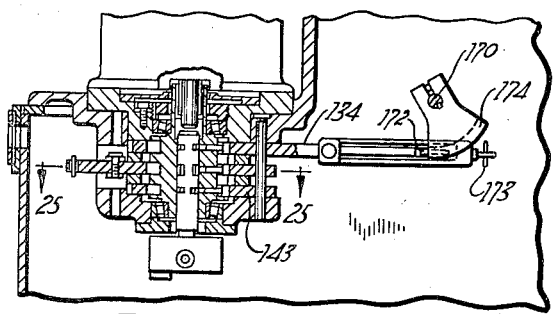
Figure 24 is a section on the line 24—24 of Figure 3 showing details of the feed rate control mechanism.
Figure 25:
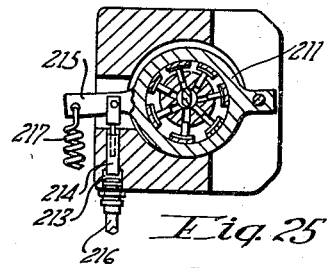
Figure 25 is a detail section on the line 25—25 of Figure 24.

The variable delivery pump, indicated by the reference numeral 134, is shown in Figures 23, 24, and 28. As shown in Figure 28 this pump has an intake 135 for withdrawing fluid from a reservoir 136 which is located in the bed 10 of the machine and a delivery pipe 137 which is connected to port 138 of cylinder 139, which cylinder contains the plunger 133. In principle, an hydraulic resistance is provided for varying the rate of escape of the fluid from the end of the cylinder and thereby varying the unit pressure acting on the right hand end of plunger 133. This hydraulic resistance may be created by forming a taper 140 on the end of plunger 133 which is movable with respect to an elongated port 141 which has connected to it the return line 142. As the tapered spool moves with respect to port 141 the rate of escape of the incoming fluid is varied and thereby the unit pressure is varied.

In order to stabilize the position of plunger 133 an opposing pressure must be created which must have such a value that when combined with the reaction of the pump pendulums on pin 132, they will be equal to the pressure on the right end of the plunger. This opposing hydraulic pressure is supplied by a variable delivery pump 143, which as shown in Figure 24 is mounted co-axially of the prime mover 119 for simultaneous actuation thereby along with pump 134. The pump 143, although of the variable delivery type, is initially adjusted when the machine is built to supply the necessary operating pressure. This pump has an intake 144 and a delivery channel 145 through which fluid is delivered to port 146 located in the left hand end of cylinder 139. This pressure is automatically controlled by a differential valve 147 which acts in such a manner as to equalize the forces acting on the plunger 133 and thereby stabilize the same.

The line 145 and the channel 137 are connected to ports 148 and 149 respectively of the differential valve. This valve has a small end 150 which is acted upon by the pressure in channel 137 and a large end 151 which has an area which is twice that of the end 150. The channel 145 is also connected through a branch line having a fluid resistance 152, serially arranged therein to port 153 of the differential valve. The differential valve plunger 154 has an annular groove 155 formed therein which is of such longitudinal length as to completely uncover port 153 but partially close port 148. The annular groove is connected by a cross bore 156 to an axial bore 157 which terminates at the large end of the differential plunger. The left end of the valve cylinder 147, as viewed in Figure 28, is connected through an hydraulic resistance 158 to a return line 159.

The operation of the device is as follows. When the plungers 133 and 154 are stationary and in equilibrium, the hydraulic resistance formed by the tapered spool 140, partially closing port 141, creates a definite pressure in line 137 and thereby a definite unit pressure acting on the small end 150 of the differential valve plunger 154. The fluid from pump 143 at this time flows through port 148, and due to the fact that this port is partially closed there is a drop in pressure created, which drop is sufficient to cause the unit pressure acting on the large end 151 of plunger 154 to be one-half of the unit pressure acting on end 150 whereby the total pressure acting on the end 151 is equal to the total pressure acting on the end 150. On the other hand, the fluid resistance formed by the partial closing of port 148 builds up a definite pressure in channel 145 which is communicated, through port 146, to the left end of plunger 133 and this unit pressure may be greater or smaller than the unit pressure acting on the right hand of plunger 133, depending upon the resultant reaction of the pump pendulums on the pin 132 because they are capable of acting in a direction with or opposed to the force acting on the left end of plunger 133.

The hydraulic resistance 152 creates a definite drop in pressure to the port 153 and since this port is never closed and since the flow in line 145 is constant it insures that a definite pressure will be acting on the left end of plunger 154 which may be varied in accordance with the opening or closing of port 148. Since the higher pressure in line 145 is capable of being admitted to the left end of plunger 154 it insures a quick positioning of the differential valve when a change in flow occurs in line 137.

If, when the parts are stabilized, a change in the rate of flow in line 137 is effected by the operator changing adjustment of the variable delivery pump 134, the pressure in line 137 will rise or fall, depending, of course, upon whether the volumetric displacement of the pump is increased or decreased; and, if increased, the pressure acting on the right hand of plunger 133 will momentarily rise and thereby cause shifting of the pin 132 toward the left, and simultaneously this rise in pressure will cause a shifting of the differential valve 154 toward the left with the result that the port 148 will be opened. Since the fluid resistance at port 148 is now reduced the pressure in line 145 will momentarily fall, thereby creating a large differential on opposite ends of plunger 133, thereby quickening its movement. The movement, however, will open port 141, causing the pressure in line 137 to fall, thereby reducing the opposition to movement of the differential plunger 154 toward the right, which movement will continue until the pressure built up on the channel 145 is sufficiently high to stabilize plunger 133 and thereby hold it in its new position.

If the adjustment of pump 134 was such as to decrease the volumetric delivery thereof the plunger 133 will momentarily move toward the right, thereby increasing the pressure in channel 137, but the differential plunger 154 will move toward the right, which will increase the flow to the left end of cylinder 139 to follow up the movement of piston 133 which will continue until the port 141 has been closed a sufficient amount to reestablish the former unit pressure in that line.

The fluid flowing into the left end of the differential valve cylinder is also utilized to supercharge the circuit supplied by pumps 110 and 116 and to this end the cylinder is provided with a port 160 to which is connected a channel 161 having four branches—162, 163, 164, and 165, in each of which is a check valve 166 whereby when the pressure drops in any of channels 108, 109, 114 or 115 below that determined by the setting of the check valves 166 the valve will open and admit fluid to the respective lines. The port 160 is so located that when the plunger 154 shifts in such a direction, that is, to the left to cause a building up of pressure on the end 151, the port 160 will close so as to assist in building up this pressure.

The mechanism for manually adjusting the variable delivery pump 134 comprises a manual control lever 167 which is pivotally mounted on a pin 168 at the front of the machine as more particularly shown in Figure 1, and is connected by a link 169, Figure 23, and a crank 169a for rotation of a shaft 170. This shaft extends rearwardly through the bed to a point adjacent the end of the control pendulum 171 of pump 134. This pendulum has a roller 172 which is held by a spring 173 into engagement with a segmental shaped cam member 174 which is attached, as shown in Figure 24, to the shaft 170. The shape of the cam is such that as the member 174 moves in a clockwise direction, as viewed in Figure 24, it will increase the pump displacement and thereby the feed rate. The handle 167 has a pointer 175 integral therewith which moves relative to a graduated scale 176 for indicating at all times the prevailing feed rate setting of the pump.

The mechanism just described is utilized for changing the radial position of the pin to and from the center or axis of the tracer head but this adjustment alone only changes the rate of movement but does not change the direction of said movement. The direction of movement is controlled by the tracer in contact with the pattern, and the mechanism for doing this consists of an hydraulic control circuit and a power operable means for rotating the tracer head which in turn, determines the radial line along which the control pin will move. From this it will be obvious that the cylinder 139 must be rotated about a vertical axis in order to change the plane in which the plunger 133 will reciprocate. To this end the cylinder is formed integral with the sleeve 177 which is rotatable in the casting 178. The sleeve also has integral therewith a gear 179 which interengages with a gear 180 attached to the end of the shaft of the hydraulic motor 181.

As shown in Figure 28, the motor 181 is connected by channels 182 and 183 to the cycle control valve 184, various sections of which are shown at 185, 186, 187, 188, and 189 in Figure 28 and taken along similar marked lines in Figure 18. The channel 182 is connected to ports 190 and 191 of the cycle control valve and the channel 183 is connected to ports 192 and 193 of the cycle control valve. This valve has a rotatable plunger 194.

The plunger 194 has a handle 195 secured to the end thereof, as shown in Figure 18, and integral with the handle is a pointer 196 for indicating the three positions which the valve may assume. When the handle is moved counter-clockwise, as viewed in Figure 26, to position the valve in its "horizontal automatic" position, the port 190, as shown in section 188 of Figure 28, is connected by the cross bore 197 to port 198; port 191 is entirely disconnected from any other part of the circuit; port 192 is connected by a cross bore 199 to port 200 and port 193 is also disconnected from the remainder of the circuit. The result is that channel 182 is thus connected to channel 201 and channel 183 is connected to channel 202. These channels terminate in ports 205 and 206 of the tracer controlled valve. These ports are more particularly shown in Figure 8a and constitute radial bores extending to the interior bore of the sleeve.

The sleeve also has a pressure port 207, located between the other ports, and connected by channel 208 and valve 209 to channel 210, which receives its supply from an accumulator pump 211, having an intake 212 through which fluid is withdrawn from the reservoir 136. This pump has a cylinder 213 in which is contained a piston 214 engaging the displacement control pendulum 215 of the pump. The end of the cylinder is connected by a branch 216 to line 210 whereby whatever pressure exists in the line also exists in the cylinder. A spring 217 normally acts in a direction to increase the displacement of the pump and the pressure in the cylinder, and when great enough to overcome compression of the spring, acts to reduce the displacement of the pump. This automatically maintains a more or less constant pressure in line 210 and automatically prevents the pump from working when sufficient pressure exists in the line, thereby saving overheating of the oil.

The tracer control valve plunger 218 has an annular spool 219 which normally closes the pressure port 207 when the tracer is deflected to a neutral position, thereby preventing flow to channels 201 and 202, and thus no rotation of motor 181 takes place.

The tracer valve plunger 218 is supported by an antifriction ball 220 on the end of the tracer arm 221, which has a hemispherical portion 222 intermediate its length whereby it is supported for universal movement. Dependence may be placed on the weight of plunger 218 to maintain the same in contact with the end of the tracer arm, or if not sufficient, a spring 222' may be interposed between the top of the plunger for exerting a downward pressure thereon. The ball 220 engages depressions in the abutting ends of the plunger 218 and the arm 221 whereby when the arm is laterally deflected in any direction, or axially moved, the plunger 218 will be also moved.

The manner of operation whereby the tracer controls the movement of pin 132 about the center of the tracer head to control the resultant direction of movement of the two slides 11 and 12 will now be explained. It will be assumed that the tracer 223 is already in engagement with the edge of a pattern and is held deflected by the pattern a sufficient amount to position the valve plunger 218 in the neutral position previously mentioned. The feed rate control lever 167 is rotated clockwise from the position shown in Figure 1 to a predetermined feed rate position, which means that the pin 132 will be eccentrically located with respect to the axis of the tracer head. The result is that the tracer and cutter will be relatively moved in a predetermined direction, depending upon the rotatable position that the tracer head happens to be in, which position is always indicated by an arrow 224, Figure 10, carried by the spoke 225 of a hand wheel 226, which, as shown in Figure 8, is integral with the tracer head. So long as the edge of the pattern extends in the direction in which the arrow 224 points the direction of relative movement between the cutter and work and between the tracer and pattern will remain the same, but when the edge veers to the right or left of this direction the tracer will undeflect or overdeflect, and the valve plunger 218 will move away from its neutral position and either down or up, depending of course upon the profile.

If it moves down, pressure from port 207 will be admitted to port 205 and, through the subsequent connections, to channel 182 of motor 181, causing rotation of the motor in one direction and thereby a similar rotation of the tracer head and of the cylinder 139, thereby moving the pin 132 in a circumferential direction about the center of the tracer head.

On the other hand, if the valve plunger 218 is moved upward, the pressure port 207 is connected to port 206 and through the subsequent connections to channel 183 of motor 181, causing the same to rotate in an opposite direction with a resultant opposite direction of movement of the tracer head and of the pin. In this manner the tracer is capable of controlling the rotational movement of the cylinder 139 and of the pin 132 which, in turn, correspondingly changes the ratio of the displacement of pumps 110 and 116 in such amounts that the resultant direction of movement is changed, and so changed as to follow the new direction that the profiling of the pattern takes. It will now be seen that the rate control lever 167 controls the amount of radial movement of pin 162 and that the motor 181, or the hand wheel 226, controls the circumferential position of the pin 132 and thereby the resultant direction of relative movement produced by slides 11 and 12 between the cutter and work and between the tracer and pattern.

Attention is invited to the fact that the portion of the tracer valve which controls the flow to ports 205 and 206 is in effect a servo control valve and that it is directly connected to the motor 181 and that actuation of the motor 181 directly changes the direction of relative movement of the pattern with respect to the tracer whereby the pattern reacts on the tracer to reposition the servo control valve and thus cause a follow-up movement which is typical of servo control devices.

When the cycle control valve is in the profiling position, to which it is assumed that it has been moved, it also establishes certain connections whereby the vertically movable carrier may be manually adjusted at will and even during a cutting operation. The mechanism for this purpose and the connections established will now be explained.

Referring more particularly to Figure 11, the ram 12 has a cylinder 227 integrally attached thereto in which is slideably mounted a piston 228 which has a piston rod 229 extending from opposite faces thereof whereby the piston has equal pressure faces. The piston rod is attached at 230 to the vertically movable carrier 13.

The piston rod has a pair of axially extending bores 231 and 232 which terminate in ports 233 and 234 respectively, which are connected by channels 235 and 236 to ports 237 and 238 of the cycle control valve, as more particularly shown in Figure 28. When the cycle control valve is in the assumed position to yield a profiling cycle, port 237 is connected by groove 239 to port 240; and port 238 is connected by groove 241 to port 242. These ports are connected by channels 243 and 244 respectively to ports 245 and 246 of the servo control valve, indicated generally by the reference numeral 247.

The servo valve 247 has a port 248 which is connected by channel 249 to port 250 of the cycle control valve. As shown at section 189, when the valve is rotated in a counterclockwise direction the port 250 is connected by diametrical bore 251 and intersecting radial bore 252 to port 253, which is connected to the output line 216 of the variable delivery pump 211. Thus, the port 248 is at this time a pressure port, and is located between ports 245 and 246 so that upon relative movement between the plunger 254 and sleeve 255 one of ports 245, 246 will be connected to pressure and the other one connected to exhaust.

The sleeve 255, as shown in Figure 15, is rotatably journaled on the plunger 254 which has a reduced portion 256 which is fixed with the ram 12. The lower end of the plunger has a nut 257 threaded thereon and so located as to permit a limited axial movement of the sleeve 255 relative to the plunger 254. The sleeve 255 has a rectangular shaped portion 258 on the lower end thereof, as shown in Figure 14, upon which is formed a threaded segment 259 which meshes with the lead screw 260. A spring-pressed ball 261 normally acts to maintain interengagement between the segment and the lead screw. A fluid operated plunger 262 is adapted to act through the interconnecting pin 263 for causing rotation of the member 258 in a clockwise direction, as viewed in Figure 14, to effect disengagement of the segment 259 from the lead screw 260. The plunger 262 is connected by channel 263' to port 264 of the cycle control valve, as more particularly shown in Figure 28.

When the cycle control valve is in "horizontal automatic" position, the port 264 is connected to the exhaust groove 265 whereby the segment 259 is in engagement with the lead screw 260, whereby at any time that the lead screw 260 is rotated the servo-valve mechanism is operated to effect vertical adjustment of the spindle carrier.

The lead screw 260 has a bevel gear 266 integrally secured to the lower end thereof which intermeshes with a bevel gear 267 secured to the end of the rotatable shaft 268, to the outer end of which is attached a manually operable handle 269. The shaft 268 has a graduated dial 270 fixed for rotation therewith for indicating micrometrically the amount of movement imparted to the vertical slide.

In addition, dial 270, which of course only registers the movement effected by one rotation of the lead screw, the machine is provided with additional means for measuring the total length of movement of the slide up to and inclusive of its limit of movement. This means comprises a scale 271 which is fixed against movement with respect to the ram 12 by the mechanism shown in Figure 13. Screws 272 serve to attach the scale 271 to a vertically extending member 273, which has a dovetail connection 273' (Figure 10) with the vertical slide 13. The member 273 is connected by a pin 274 to the housing 275, which in turn is connected to the slide 12. The pin 274 passes through a bushing 276, which bushing rides in a slot 277 formed in the forward wall of the ram 13.

The dovetail guide 273' is formed in a plate 278 which also has formed therein a T slot 279, in which slides a T-headed clamping bolt 281 for securing a marker 282, which may be clamped in various positions for relative movement with respect to the scale 271. The member 273 may also have a T slot 280 formed therein to which may be secured adjustable markers 283 and 284 for indicating the limit of movement of the slide by means of the marker 282 which is movable with the slide. The scale may, of course, be graduated into suitable main sub-divisions, depending upon the pitch of the lead screw, and movements less than these sub-divisions may be determined from the dial 270.

It will thus be seen that when the cycle control valve is in the "horizontal automatic" position that the handle 269 may be rotated to move the spindle carrier up or down with respect to the work table. In so doing, the operator might not watch the position of the tracer and a safety means has been provided to prevent the operator from continuing the movement after the tracer has contacted an object in order to prevent damage to the parts.

This means comprises a safety valve 286 which, as shown in Figure 28, has a port 287 connected by channel 288 to line 236, which leads to the upper end of the vertical cylinder. The valve has a plunger 289 upon which is formed a spool 290, the plunger being held by a spring 291 normally in a position to close the port 287. The spool 290 has a tapered portion 292 movable with respect to an exhaust port 293, whereby when the plunger is shifted toward the right the port 287 will be connected to port 293. This will open the supply line 236 leading to the upper end of the cylinder and prevent further supply of fluid thereto.

The housing 294, in which the plunger 289 is reciprocable, has a port 295 connected by channel 296 to line 297. This line terminates in a port 298 in the tracer head. When the tracer is undeflected the port 298 is closed, but when the tracer contacts an object and is deflected a spool 299 on the tracer valve moves upward and interconnects port 298 with port 300, which port is connected by a branch line 301 to the supply line 137. This admits fluid to channel 296 and port 295, causing shifting of the safety valve plunger to the right, and automatic interconnection of port 287 with port 293.

If the handle 269 is rotated further, the spring pressed ball 261 in Figure 14 will yield, permitting the member 258 to rotate in a direction causing disengagement of the segment 259 from the lead screw 260. This will prevent damage to the parts and prevent the servo valve from getting out of position with respect to the control ports, and so that when the pressure is re-established again it may immediately assume control.

When the cycle control valve is in the "horizontal automatic" position and the end of the tracer lies in such a plane that it is only necessary to move it laterally to effect engagement with the pattern, means have been provided for effecting this lateral movement comprising an engagement valve and a manually operable control valve therefor. At this time the tracer will, of course, be undeflected and the feed pump will be set at zero. A valve 302, having an operating handle 303, is positioned as shown in Figure 8b so that the arrow 304 thereon points to the position marked "hand". This positions a cross bore 305 therein whereby it will interconnect port 306 of the tracer valve to port 307 located in one end of the engagement control valve 209. Since the tracer is undeflected, port 306 is connected by annular groove 308 in the tracer valve plunger, as shown in Figure 8a, to port 300 to which is connected the branch line 301 which is supplied by the feed pump 134.

The control lever 167 is now moved to the right as viewed in Figure 1, causing delivery of pressure fluid through the connections just described to the left hand end of the tracer engagement control valve, shifting the same to the right against the compression of spring 309. It will be noted that the line 310 which interconnects valve 302 to port 307 has a branch line 311 which is connected through an hydraulic resistance 312 to port 313 of valve 209.

When the plunger 314 is in its left hand position, as shown in Figure 28, an annular groove 315 formed therein interconnects port 313 with an exhaust port 316. When fluid is admitted to channel 310, however, the pressure gradually rises therein, in spite of leakage through resistance 312 to reservoir, and causes movement of the plunger 314 toward the right. This movement gradually closes port 313, thereby cutting down the amount of leakage and causing the pressure in channel 310 to continue to rise, whereby it reaches a maximum when the port 313 is closed, which thereby maintains the plunger in a right hand position, and at the same time, terminates further flow or leakage from channel 310. When the valve is in its right hand position it disconnects port 317 from port 318, thereby disconnecting the pressure supplied to port 207 of the tracer controlled valve. The valve plunger 314 also has an annular groove 319 which interconnects port 320 with port 321. These ports are connected by channels 322 and 323 respectively to annular grooves 324 and 325 which communicate with ports 205 and 206.

This last connection, in effect, interconnects channels 182 and 183 of motor 181 whereby the motor is short-circuited. This permits the tracer head to be rotated by the hand wheel 226 without interference from the motor. Thus the operator can rotate the hand wheel and steer the tracer in such a direction that it will contact the pattern.

Upon engagement of the tracer with the pattern, the operator throws the valve control lever 303 in a clockwise direction, as viewed in Figure 8, to the "automatic" position. The valve plunger 302 has grooves 326 and 327 formed longitudinally thereof and displaced 90° with respect to the cross bore 305, and since these grooves run out to the end of the valve and communicate with atmosphere they serve as exhaust ports for channel 310 and port 306. Since the pressure is now reduced on the left hand end of the tracer engagement control valve, the spring 309 shifts the valve plunger 314 to the left hand position in which it is shown in Figure 28.

This immediately interconnects port 317 with port 318 whereby fluid pressure is supplied to port 207 of the tracer control valve, and at the same time disconnects channel 323 from 322 so that the motor 181 is now no longer short-circuited but is connected through port 205 or 206, to the pressure port 207 and will rotate in accordance with the position of the tracer valve as determined by the amount of tracer deflection.

Should the operator fail to rotate the valve 302 at the proper time, no harm will be done because the tracer will merely be deflected a slight additional amount beyond its normal working position, at which time the pressure port 300 will be interconnected by annular groove 308 to port 298 which will thereby cause fluid to flow through channel 297 to the right hand end of valve 209, and thereby positively shift the plunger to the proper position. This is possible because the pressure of the fluid plus the pressure of spring 309 will be greater than the pressure on the opposite end of the plunger.

When the profiling operation is completed, and the operator desires to disengage the tracer from the pattern, he moves the control valve 302 to its "hand" position which thereby shifts the tracer engagement control valve to its right hand position, which permits the operator to rotate the hand wheel 226 to such a direction that it is possible for him to steer the tracer out of engagement with the pattern. In other words, the hand lever 303 serves as a means for selecting between manual guiding of the tracer by the hand wheel or automatic guiding of the tracer by power means.

When the cycle control valve is in the "horizontal automatic" position, the tracer moves in a circumambulatory path about the pattern, and without more, this is satisfactory for pure outlining purposes. The movement is purely two-dimensional. This position of the cycle control valve is also utilized for die-sinking purposes, involving three-dimensional movement by the utilization of additional means now to be described, which effects an additional relative movement between the tracer and pattern and between the cutter and work in a direction at right angles to the plane of the previously described profiling operation. This means is more particularly shown in Figures 8, 10, 13, 17, and 28. The hydraulic motor 181, which has the gear 180 integrally connected thereto, has another gear 328 superimposed in co-axial relation to the gear 180 and connected thereto by means of a pin 329 integral with gear 328 and riding in a groove 330 formed in the upper face of gear 180, this groove being circular in form but discontinuous whereby a lost motion connection is created between the gear 180 and the gear 328.

Figure 17:
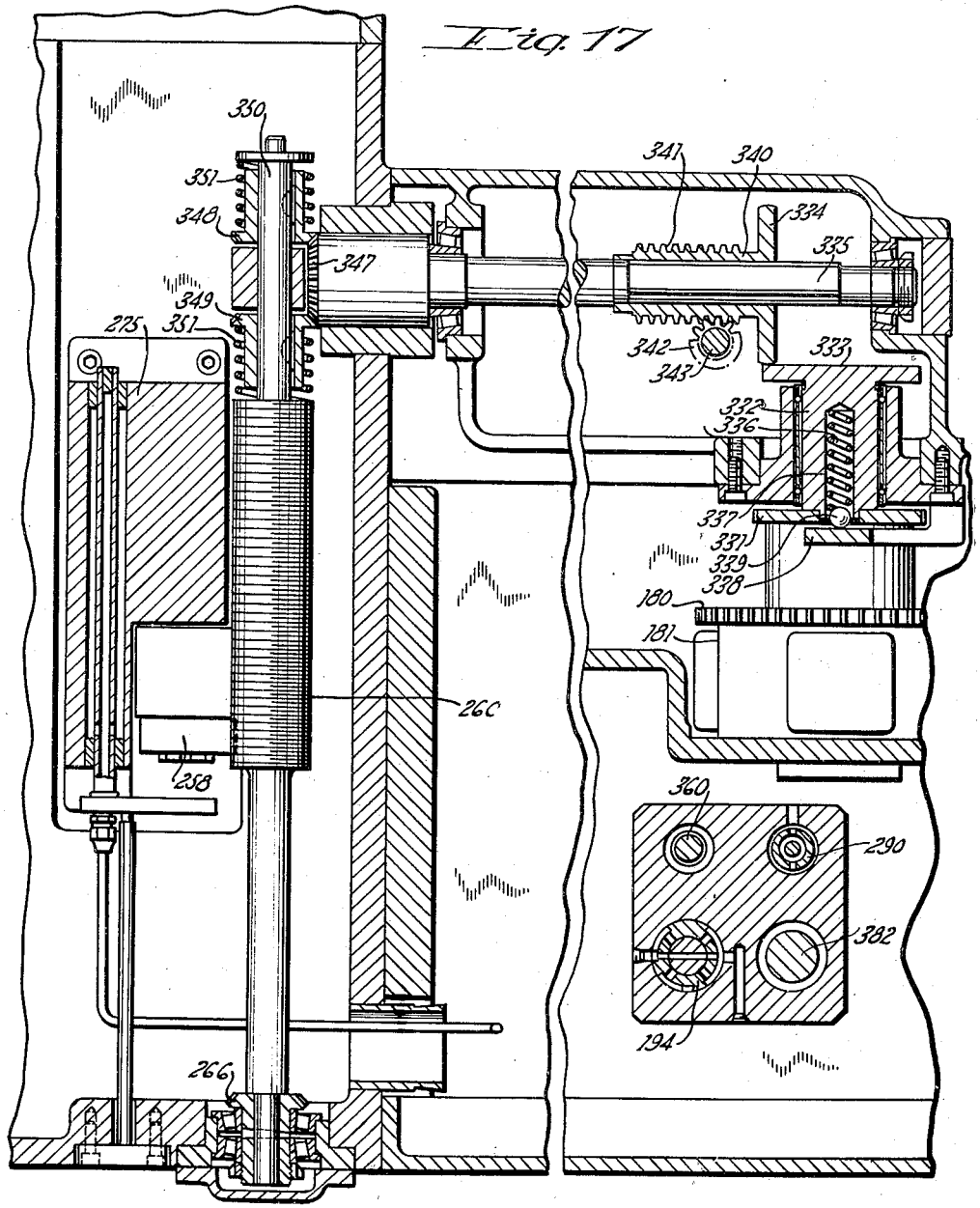
Figure 17 is a vertical section on the line 17—17 of Figure 13, showing the connections of the power operable mechanism to the servo-screw.

This gear intermeshes with a gear 331 which, as shown in Figure 17, has an elongated hub 332, to the upper end of which is formed a friction disc 333. This friction disc is engaged by a friction wheel 334 splined on a shaft 335 which supports the wheel 334 in a plane at right angles to the face of the disc 333. The gear 331 is capable of limited axial movement, and a spring 336 mounted in an axial bore 337 in the hub 332 serves to maintain sufficient pressure between the frictional members so that one will drive the other. A fixed abutment 338 is provided for the spring, and to reduce friction, a ball 339 is interposed between the abutment and one end of the spring.

Variation in the rate of rotation of the shaft 335 by the gear 331 is obtained by mounting the friction wheel 334 for radial movement to and from the center of rotation of the disc 333, and to this end the member 334 has an elongated hub 340 upon which is formed a plurality of circular rack teeth 341, intermeshing with a pinion 342 secured to shaft 343. This shaft, as shown in Figure 8, projects to the front of the machine where it is provided with a manually operable lever 344 having integral therewith a pointer 346 movable with respect to a fixed dial 345 to indicate the amount of vertical movement for each rotation of the tracer head.

As shown in Figure 17, the shaft 335 has a bevel gear 347 fixed to the end thereof for inter-engagement with bevel gears 348 and 349, slideably keyed on the reduced end 350 of the lead screw 260. Springs 351 normally act to maintain the gears 348 and 349 in engagement with the gear 347 whereby the lead screw 260 is normally held against rotation. A member 352 which is held against axial movement with respect to the lead screw is interposed between the bevel gears 348 and 349, and has slideably mounted therein a pair of fluid actuable pistons 353 and 354. The piston 353 abuts the face of bevel gear 349 for shifting the same out of engagement with bevel gear 347. The piston 354 abuts the bevel gear 348 for moving the same out of engagement with bevel gear 347. As shown in Figure 28, the pistons 353 and 354 are connected by the respective channels 355 and 356 to ports 357 and 358 of an up and down progression control valve 359.

This control valve comprises a plunger 360, Figure 18, which is rotatably mounted in a sleeve 361 having a port 362 which is permanently connected to the pump 211 whereby it is continuously under pressure. The plunger has an annular groove 363 intersected by a cross bore 364, which in turn is intersected by an axial bore 365 whereby the latter is continuously supplied with pressure. The axial bore 365 is intersected by a second cross bore 366, which is adapted to be moved by the manual operable handle 367 to position the same in communication with either port 357 or port 358 whereby fluid pressure may be selectively supplied to either plunger 354 or plunger 353 to disengage either gear 348 or 349 from driving engagement with bevel gear 347.

The plunger 360 also has a pair of axial extending grooves 368 and 369 formed in its periphery, which grooves, as shown in Figure 18, extend to one end of the plunger to form exhaust grooves. In Figure 28 these grooves are diagrammatically illustrated as connected to an exhaust channel 370. As shown in Figure 26, the handle 367 has pointers 371 and 372 on opposite ends thereof, which cooperate with suitable indicia on the plate 373 to indicate in which direction the resultant movement will take place, and taking into consideration the fact of whether the tracer is engaging the exterior or the interior of a pattern. The latter is necessary because the tracer head construction and control circuit is so designed that when the tracer is deflected after movement in a rectilinear direction by an object, it will always change its direction toward the right when viewed from the starting end of the rectilinear path. Thus, the operator determines first whether the tracer is engaging an external or internal surface and then turns the handle 367 in the desired direction from the central position shown, to obtain the desired direction of progressive feed.

The cycle control valve is adjustable to a second position termed "vertical" as shown in Figure 26, and in this position the tracer is capable of automatically following an irregular profile which lies in a vertical plane. In this position of the cycle control valve the rotary hydraulic motor 181 is disconnected from the tracer control valve and the vertical cylinder 227 connected in its stead. The direction in a horizontal plane in which this movement will take place will always be determined by the rotatable position of the hand wheel 226, or in other words, in the direction in which the arrow thereon points. This direction may be changed at any time by merely manually rotating the hand wheel 226. In other words, in this cycle of operation the direction of movement is manually controlled and varied, the tracer merely automatically controlling the vertical position of the tracer and cutter. In the various sections of the cycle control valve, Figure 28, the valve plunger is shown in the proper position to effect this cycle of operation. Briefly, the connections are as follows.

The upper end of cylinder 227 is connected through channel 236, cross bore 197 (section 188) and channel 201 to port 205 of the tracer valve. The lower end of cylinder 227 is connected by channel 235, cross bore 199 (section 185) and channel 202 to port 206 of the tracer controlled valve. Thus, upward or downward movement of the tracer from a neutral position will connect the pressure port 207 selectively to the upper or lower end of cylinder 227, causing a corresponding movement thereof.

The channel 182 of motor 181 is interconnected through port 191, groove 374, port 193 (section 186) to channel 183, whereby the hand wheel 226 may be rotated because rotation of the hand wheel causes simultaneous rotation of the motor 181, and since the two motor ports are interconnected, the fluid may freely flow from one side of the motor to the other.

It will also be noted, at this time, that delivery line 216 of pump 211 is connected through the connections shown in section 189 of the cycle control valve to channel 263 and thereby to plunger 262, which rotates the segment 259 out of engagement with the servo-lead screw 260.

The manner in which the tracer is engaged with the pattern for this type of cycle will now be explained. It will be assumed that the tracer and cutter are above the pattern and work and out of engagement therewith and that the control valve lever 303, Figure 8b, is in the position shown in that figure. Since the tracer is out of engagement, the tracer valve 218 (Figure 8a) is axial downward from the position shown a sufficient amount to interconnect port 300 with port 306, whereby when the feed pump 134 starts to deliver fluid to line 137, the same will flow through the various connections to the left end of the engagement control valve 209, shifting the plunger thereof to its right hand position. This will disconnect the pressure line 210 from pressure port 207, and no fluid will flow from this port to port 205, which is connected therewith at this time, and thus no fluid will flow to the upper end of cylinder 227 to cause downward movement thereof. The importance of the valve connected to the control lever 303 in this cycle is that whenever the same is moved to the "hand" position the vertical head will remain in whatever position it happens to be at the time the lever 303 is thrown to this position. This will be true because ports 205 and 206 become interconnected by groove 319 and therefore the pressures in opposite ends of the cylinder 227 equalize. Since the vertical slide is counterbalanced by the weight 440 connected by chain 441, Figure 3, and considerable friction exists in the guideways there is no tendency whatever for the vertical slide to move even although there is some leakage to reservoir from port 206.

Upon movement of the control lever 303 to the "automatic" position the engagement control valve resumes the position in which it is shown in Figure 28, whereby fluid from pressure line 210 immediately flows to pressure port 207 and thereby to the upper end of cylinder 227, causing the vertical head to move downward until the tracer engages the pattern. At the end of a profiling operation disengagement is effected by manually overdeflecting the tracer 223 to such an extent that the pressure port 207 is connected to port 206. When the head has reached the desired elevation, the hand lever 303 is turned again to its "hand" position, which will thereby retain the head at a fixed elevation.

The cycle control valve is movable to a third position which, as shown in Figure 26, is entitled "vertical automatic." The difference between this cycle and the "vertical" cycle is that when the machine is set for the latter cycle, the direction of movement of the tracer and of the cutter must be manually controlled, whereas in the cycle now to be described it is automatically controlled in the sense that relative movement takes place in a given plane and at any predetermined time the movement will be automatically reversed, and at the same time a small cross feed or lateral indexing will be effected between the parts whereby the tracer and cutter in returning will operate in a plane parallel to the first plane or laterally displaced with respect thereto. In other words, an automatic reciprocating cycle will be effected and an indexing will take place at the end of each stroke, it being understood that during each stroke relative movement of the cutter toward and from the work will be taking place under guidance of the tracer in contact with the pattern.

Rotation of the lever 195 (Figure 26) in a clockwise direction to the "vertical automatic" position will rotate the various sections of the valve plunger 194, shown in Figure 28, in a clockwise direction with the following results.

The cross bore 251, section 189, will connect pressure port 253 to port 375 and thereby, through channel 376, to port 377 of a reversing valve 378. Channel 236 from the upper end of cylinder 227 will be connected by the cross bore 197, section 188, to channel 201 and thereby to port 205 of the tracer valve. The branch from channel 236 leading to section 194 will be closed at this time.

Channels 182 and 183 of hydraulic motor 181 will be connected by grooves 374 and 377, as shown in section 186, to channels 378 and 379 respectively, which terminate in ports 380 and 381 of the reversing valve 378. The channel 235, which is connected to the lower end of cylinder 227, will be connected by the cross bore 199 to channel 202 and thereby to port 206 of the tracer valve.

From the foregoing it will be seen that the vertical cylinder 227 is connected to the tracer control valve and that the hydraulic motor 181, which controls rotation of the tracer head, is connected to the reverse valve 378. The reverse valve has a rotatable plunger 382 in which is formed a pair of cross bores 383 and 384 which are in 90° phase relation, whereby the pressure line 376 is always connected to either port 380 or 381.

The fluid operable ratchet mechanism is provided for intermittently rotating the plunger 382 to reverse the direction of rotation of the hydraulic motor 181, and thereby of the tracer head, and a stop is provided for limiting this movement so that each time the reverse valve is operated the hydraulic motor rotates the tracer head through an angle of 180°, thereby reversing the direction of movement of the tracer and cutter with respect to the pattern and work.

Since the tracer is effective during rotation of the tracer head it will be apparent that the tracer will cause a small relative movement between the cutter and work in a semi-circular path with the result that not only is the direction of movement reversed but the cutter has been laterally displaced a sufficient amount that it will cut over a new surface on the next stroke.

Means have also been provided for varying the time of rotation of the motor 181 with respect to the feeding movement of the tracer and cutter whereby to vary the amount of the cross feed or indexing. This is possible when it is realized that the faster the motor 181 turns, the shorter will be the radius of the circular path and the total amount of indexing is equal to twice the radius of the semi-circular path.

The mechanism for operating the reverse valve comprises a fluid operable plunger 385, Figures 21 and 28, which is connected by channel 386 in parallel to a plurality of trip operable plungers 387, 388, and 389. These plungers are individually supplied with pressure from pump 211 and to this end the supply channel 216 from that pump has a branch line 390 leading to port 391 of plunger 387; a branch 393 leading to port 392 of plunger 388; and a branch 394 leading to port 395 of plunger 389. Each plunger has an annular groove, such as 390', and is normally held by a spring 396 in such a projected position that the annular groove does not interconnect the pressure port with the supply line 386 to plunger 385, but upon actuation of the plunger in a direction to compress the spring 396 the pressure port will be connected to channel 386 and the plunger 385 operated in a direction to rotate the reversing valve.

The plunger 387 is associated with the vertical slide, as more particularly shown in Figures 1 and 22, and is adapted to be operated by a bell crank 397, which is pivotally mounted at 398 and has a beveled end 399 for engagement by dogs 283 and 284. The dogs are adapted to contact the bell crank and rotate the same a sufficient amount to cause movement of the plunger against the compression of spring 396 so as to interconnect the pressure port 391 with channel 386 and thereby cause actuation of the reverse valve operating plunger 385.

The plunger 388, as more particularly shown in Figure 3, is mounted on the bed 10 for cooperation with dogs 400 and 401 carried by the ram 12. The plunger 389 is mounted on the front of the bed 10, as more particularly shown in Figure 1, for actuation by dogs 402 and 403 which may be mounted on the side of the table 11. From this it will be seen that the reverse valve may be operated from any one of the three movable slides and at either end of the stroke thereof. Attention is invited to the fact that should it be desirable to move the slide further in the same direction, after depressing the plunger, the same may be accomplished without any damage to the parts. In other words, the trip dog may ride over and beyond the plunger without damaging the same.

The actual construction of the reverse valve plunger 382 is more particularly shown in Figure 20, and as there shown, has a first annular groove 404 which is connected to port 388, and a second annular groove 405 which is connected to port 381. An intermediate spool portion 406 has a plurality of longitudinally extending grooves formed therein, one set of alternate grooves communicating with the groove 405 and the remaining intermediate grooves connected with the groove 404. The pressure port 377 and the exhaust port 407 are spaced 90° apart adjacent the periphery of the spool portion 406, whereby the port 377 will always be connected to one of the annular grooves and the exhaust port connected to the other. The longitudinal grooves are twelve in number whereby the valve is only rotated 1/12 of a revolution for each actuation of the plunger 385.

The plunger 385 is pivotally connected at 408 to the oscillatable collar 409, which has a spring 410 connected thereto, which normally rotates the collar in a clockwise direction, as viewed in Figure 21, and thereby moves the plunger 385 in a direction opposite to the action of the fluid pressure.

A pawl lever 411 is pivotally connected to the pin 408, as more particularly shown in Figure 19, whereby as the collar 409 is rotated the tooth 412 acts through one of the ratchet teeth on the ratchet wheel 413 to rotate the same in a counter-clockwise direction. A spring 414 constantly urges the pawl lever 411 into engagement with the periphery of the ratchet wheel. A spring actuated locking lever 415 prevents return movement of the ratchet wheel during return movement of the pawl 411.

The ratchet wheel 413 is formed integral with the end of plunger 382, as more particularly shown in Figure 20.

It will thus be seen that each time the fluid pressure actuates the plunger 385 that the reverse valve is rotated through 1/12 of a revolution. This will cause reverse rotation of the hydraulic motor 181.

Means are associated with the tracer head to limit the amount of rotation thereof to 180° and consists of a collar 416, which as shown in Figure 9, has shoulders 417 and 418 formed thereon which are adapted to abut opposite sides of a hydraulically positionable stop 419. This stop is pivoted at 420 and a spring 421 normally acts in a direction to remove the stop from engagement with the shoulders. This collar has teeth 422 formed on the upper side thereof (Figure 8) adapted to interengage with teeth 423 formed integral with the tracer head, whereby upon rotation of a collar 424 threaded on the hub of hand wheel 226, the teeth may be interengaged and the collar 416 locked for rotation with the hand wheel and tracer head. Thus, when the hydraulic motor is rotated in one direction the shoulder 418 will abut one side of the stop member 419, and when rotated in the opposite direction the shoulder 417 will abut the opposite side of the stop 419. The shoulders are so spaced that the amount of rotation is equal to 180°. The stop is fluid actuated by a piston 425 which is connected by a channel 426, as more particularly shown in Figure 28, to channel 376 whereby the stop is held in engagement with the periphery of the member 416 as long as the tracer control valve is in the "vertical automatic" position.

The rate of rotation of the hydraulic motor 181 is controlled by a throttle valve 427 which has a bevel gear 428 integrally connected with the end thereof and this gear, as shown in Figure 8, intermeshes with a bevel gear 429, which in turn intermeshes with a second bevel pinion 430 integral with the operating lever 431. This lever has a pointer 432 integral therewith and movable over a scale 433 located on the front of the machine, as more particularly shown in Figure 1.

This makes it possible for the operator to adjust the throttle valve 427 from the front of the machine and thereby determine the amount of cross feed during a reciprocating cycle.

Means have been provided, as shown in Figure 27, for supplying a cooling medium, should the same be desirable. It has been found that in some operations, such as in die-sinking, that compressed air is preferable to a liquid because the liquid tends to fill up the cavities and prevent a clear observation of the cutting operation, while in other operations a form of coolant liquid might be preferable. In view of this, both forms have been made available by providing a selector valve 434 to which is connected a compressed air pipe 435 and a coolant liquid pipe 436. The delivery line 437 has a throttle valve 438 therein for controlling the rate of delivery of either source of supply.

I claim:

1. In a pattern controlled machine tool having a pair of fluid operable slides translatable in directions normal to each other, the combination of independent variable delivery pumps for determining movement of each slide, a rate control pendulum associated with each pump, a control member operatively connected to said pendulums for individual or joint movement thereof, a tracer for contacting a pattern, and a servomotor mechanism coupling said member for control by the tracer.

2. In a pattern controlled machine tool, the combination of a plurality of fluid operable slides movable along angularly related paths, individual variable delivery sources of pressure for each slide, each including control member adjustable to determine rate and direction, said members being simultaneously positionable in a neutral position whereby all slides will be at rest, a first fluid operable means for moving one or more of said control members from the neutral position to cause movement of one or more slides, a tracer adapted to follow a pattern, and additional fluid operable means including a servo-motor mechanism having a servo-valve directly connected to the tracer for individually or simultaneously shifting said control members.

3. In a pattern controlled machine tool having a plurality of slides movable in angularly related directions for determining a cutting path between a tool and work piece carried by the respective slides, separate fluid operable means for moving each slide including a variable delivery pump, individual variators for the pumps, a common control member for the variators, said member having a neutral position for reducing the delivery of all of said pumps to zero, a fluid operable motor for moving the member circumferentially about said neutral position for changing the direction of the cutting path, a tracer contactable with the pattern, and a servo-valve integral with the tracer for governing operation of said motor.

4. A milling machine having a plurality of slides movable in angularly related directions, separate variable delivery pumps operatively connected for causing movement of the respective slides, a common rate variator operatively connected to said pumps for simultaneously and inversely varying the delivery thereof, a servo-motor connected to said variator, and a tracer controlled servo-valve having a source of pressure connected thereto for controlling the operation of said motor and thereby the amount of change in the direction of said resultant movement.

5. In a pattern controlled machine tool having a cutter slide, and a work slide, fluid operable means for translating the slides including a pump-motor pair for each slide, a displacement control lever for each pump, a common member for shifting said control levers, a rotatable support for said member, a fluid operable motor for rotating said support to simultaneously change the volumetric delivery of said pumps, and a tracer controlled servo-control valve having a source of pressure connected thereto for controlling operation of the last-named motor.

6. In a milling machine, a slideable carriage, a rotatable cutter carried by said carriage, a work table movable relative to said carriage and provided with a master, a tracer carried by said carriage for contacting the master, fluid operable motors for moving said carriage and table, variable displacement pumps for delivering fluid to the individual motors, a control valve operated by the tracer, a fluid operable motor operatively connected for simultaneously and inversely adjusting the displacement of said pumps, a pair of channels connecting said motor to the tracer controlled valve, and a follow-up connection including the master and tracer for repositioning said valve to stop operation of the motor.

7. In a control mechanism for a part movable rectilinearly and curvilinearly, the combination of separate fluid operable devices for moving the part in each manner, a separate source of fluid pressure for supplying the individual fluid operable devices, a common valve means for determining the flow from each of said sources of pressure to the individual devices, and additional means to vary the rate of flow to one of said devices without disturbing the rate of flow to the other.

8. In a control mechanism for a part movable rectilinearly and curvilinearly, the combination of separate fluid operable devices for moving the part in each of said manners, individual sources of fluid pressure for each of said devices, a common valve means for varying the flow from each of said sources to the respective devices to cause simultaneous movement of the part in both manners, said valve means being movable to a position for terminating flow from one of said sources, and means to vary the flow to the other of said devices when said common valve means is in the last-named position.

9. In a pattern controlled machine tool having a pair of supports, one of which carries a cutter and the other adapted to carry a work piece for engagement by the cutter, the combination with fluid operable means for effecting relative movement between the supports along an undulating path and a control member which is movable in one direction to vary the rate of movement along the path and in another direction to determine changes in direction of said path, of separate fluid operable devices for determining adjustment of said member in each direction, means to supply pressure fluid to said devices, and a control valve for determining reversible operation of one of said devices and for by-passing the flow of fluid to the other of said devices.

10. In a pattern controlled machine tool, the combination of a table for supporting a work blank and a pattern, a carrier mounted for relative movement with respect to said table and having a cutting tool and a tracer mounted thereon, a pair of fluid operable motors for actuating the table and carrier respectively, means to supply fluid pressure to said motors, a common control member for determining proportionate delivery of fluid to the individual motors and thereby the direction of resultant movement between the work and cutter, fluid operable means controlled by the tracer for actuating the control member, additional fluid operable means for varying the volumes delivered to said motors without disturbing the proportions therebetween, means to supply fluid pressure to said fluid operable means, and means controlled by the tracer to by-pass the fluid delivered to one of said fluid operable means when admitting fluid to the other fluid operable means.

11. In a pattern controlled machine tool having a cutter support, a work support, separate power operable means for moving the respective supports and means to control the proportionate rate of operation of said fluid operable mea.., to thereby determine and vary the direction of the cutting path including a fluid operable motor, the combination of means for automatically controlling said motor including a tracer contactable with a pattern, a valve responsive to movement of the tracer and directly connected in servo-relation to said motor whereby the tracer may directly determine the direction of said cutting path.

12. In a pattern controlled machine tool in which the direction of the cutting path between a tool and work piece is determined by variable proportionate operation of two slides, the combination with a member movable in a direction to continuously change said proportionate rates and a fluid operable motor for moving said member, of a tracer contactable with a pattern, a control valve associated with the tracer and having a pair of ports connected to said motor, and a pair of exhaust ports, a pressure source connected to said valve, and means in the valve effective upon predetermined deflection of the tracer to connect one of said first pair of ports to the pressure line and the other to one of said exhaust ports.

13. In a pattern controlled machine tool having a first fluid operable motor for determining and varying the direction of relative movement between the cutter and a work support in one plane, and a second fluid operable motor for changing the direction of movement between the cutter and a work support in a second plane, the combination of a tracer contactable with a pattern, a servo-valve associated with the tracer, and means for selectively connecting the valve in servo relation to either of said motors.

14. A universal pattern controlled machine tool having a spindle carrier, a cutter spindle journaled therein, a work support, power operable means for effecting relative movement between the carrier and the support to produce a profile lying in the plane of the cutter axis and including a servo-motor for controlling the direction of said relative movement; a second power operable means for effecting relative movement between the carrier and support, to produce a profile lying in a plane normal to said cutter axis and including a servo-motor for determining direction, a tracer controlled mechanism including a servo-control valve, and means to selectively couple said valve to either of said servo-motors in accordance with the desired plane of the profile.

15. An automatic pattern controlled diesinking machine including a tracer and cutter, a work support, fluid operable motors for effecting relative movement between the cutter and work, means to supply pressure fluid to said motors, a member for controlling proportionate distribution of fluid to said motors to determine the direction of said relative movement in one plane, means to effect a feeding movement between the cutter and work in a direction normal to said plane including a feed control screw, a fluid operable motor, and means connecting said motor for actuation of the screw including a pair of angularly related friction discs, and means to adjust one of said discs relative to the other to vary the rate of said feeding movement.

16. An automatic pattern controlled diesinking machine including a tracer and cutter, a work support, fluid operable motors for effecting relative movement between the cutter and work, means to supply pressure fluid to said motors, a member for controlling proportionate distribution of fluid to said motors to determine the direction of said relative movement in one plane, means to effect a feeding movement between the cutter and work in a direction normal to said plane including a servo-motor mechanism, a control screw therefor, a hydraulic motor, a bevel gear driven by said hydraulic motor, a pair of bevel gears splined on said screw and interengaging said first-named bevel gear for normally preventing rotation of said screw, and fluid operable means for disengaging one of said pair of bevel gears to permit motor actuation of the feed screw.

17. An automatic pattern controlled diesinking machine including a tracer and cutter, a work support, fluid operable motors for effecting relative movement between the cutter and work, means to supply pressure fluid to said motors, a member for controlling proportionate distribution of fluid to said motors to determine the direction of said relative movement in one plane, means to effect a feeding movement between the cutter and work in a direction normal to said plane including a servo-motor mechanism, a control screw therefor, a hydraulic motor, a bevel gear driven by said hydraulic motor, a pair of bevel gears splined on said screw and interengaging said first-named bevel gear for normally preventing rotation of said screw, fluid operable means for disengaging one of said pair of bevel gears to permit motor actuation of the feed screw, and a control valve for said fluid operable means having a position for causing disengagement of both of said pairs of bevel gears to permit manual actuation of said feed screw.

18. In a pattern controlled machine tool having a cutter support and a work support, the combination with a tracer controlled mechanism including a rotary hydraulic motor for determining the direction of relative movement between the work and cutter in a first plane, of means connectible with the hydraulic motor for feeding the tool in a direction normal to said plane, a ratchet operated reversing valve for changing the direction of rotation of said motor including a fluid operable plunger, and means for trip controlling said plunger including a source of pressure, a plurality of trip operable valves connected in parallel between said source of pressure and said plunger, and means normally holding said valves in a closed position whereby opening of any valve will cause actuation of said plunger.

19. In a pattern controlled machine tool having a work support and a cutter support, the combination of a fluid operable motor for moving one support toward and from the other, a tracer controlled valve having a pair of ports connected to said motor, and a pressure port, a source of pressure, a valve normally positionable to couple said source of pressure to said pressure port, and manually operable means effective when the tracer is undeflected to cause said valve to move to a position disconnecting said source of pressure from said pressure port and thereby from said motor, and a counterbalance for holding said parts at rest.

20. In a pattern controlled machine tool having a work support and a cutter support, the combination of a fluid operable motor for moving one support toward and from the other, a tracer controlled valve having a pair of ports connected to said motor, and a pressure port, a source of pressure, a valve normally positionable to couple said source of pressure to said pressure port, fluid operable means for shifting said valve to a closed position, and means in the valve when in a closed position to interconnect said motor ports and equalize the pressures in said motor.

BERNARD SASSEN.